(12) United States Patent
Lim et al.

(10) Patent No.: US 9,835,908 B2
(45) Date of Patent: Dec. 5, 2017

(54) DISPLAY APPARATUS

(71) Applicant: SAMSUNG DISPLAY CO., LTD., Yongin Si, Gyeonggi-Do (KR)

(72) Inventors: Namjae Lim, Gwacheon-si (KR); Hyunkyu Namkung, Cheonan-si (KR); Jai-hyun Koh, Yongin-si (KR); Iksoo Lee, Seoul (KR)

(73) Assignee: Samsung Display Co., Ltd. (KR)

( * ) Notice: Subject to any disclaimer, the term of this patent is extended or adjusted under 35 U.S.C. 154(b) by 0 days.

(21) Appl. No.: 15/051,562

(22) Filed: Feb. 23, 2016

(65) Prior Publication Data

US 2016/0246136 A1 Aug. 25, 2016

(30) Foreign Application Priority Data

Feb. 25, 2015 (KR) ........................ 10-2015-0026677

(51) Int. Cl.
*G02F 1/133* (2006.01)
*G02F 1/1343* (2006.01)
(Continued)

(52) U.S. Cl.
CPC .. *G02F 1/134336* (2013.01); *G02F 1/136286* (2013.01); *G09G 3/3607* (2013.01); (Continued)

(58) Field of Classification Search
CPC ...... G09G 3/36; G09G 3/3614; G09G 3/3648; G09G 3/3607; G09G 3/2003; G09G 3/3659; G09G 3/3611; G09G 3/2074; G09G 3/3258; G09G 2300/0426; G09G 2300/0452; G09G 2300/0443; G09G 2300/0823; G09G 2300/0439; G09G 2300/08; G09G 2300/0413; G09G 2310/0235; G09G 2310/0213; G09G 2310/0202; G09G 2320/0276; G09G 5/06;
(Continued)

(56) References Cited

U.S. PATENT DOCUMENTS 7,710,374 B2 * 5/2010 Lee ........................ G02F 1/1368
345/87
7,978,162 B2 * 7/2011 Maruoka .................. G09G 3/20
345/100
(Continued)

FOREIGN PATENT DOCUMENTS

KR 10-2011-0022972 A 3/2011
KR 10-2011-0077899 A 7/2011
(Continued)

*Primary Examiner* — Thoi Duong
(74) *Attorney, Agent, or Firm* — Innovation Counsel LLP

(57) ABSTRACT

A display apparatus includes gate lines extending in a first direction, data lines extending in a second direction crossing the first direction, and pixels connected to the gate lines and the data lines. The pixels include pixels arranged in a k-th column between a k-th data line and a (k+1)th data line. The pixels arranged in the k-th column are arranged in a plurality of groups, and each of the groups includes 2i first pixels connected to the k-th data line and 2i second pixels connected to the (k+1)th data line. Successive ones of the pixels in each group are connected to the k-th data line and the (k+1)th data line in alternating manner.

24 Claims, 21 Drawing Sheets

(51) Int. Cl.
*G09G 3/36* (2006.01)
*G02F 1/1362* (2006.01)

(52) U.S. Cl.
CPC ... *G09G 3/3614* (2013.01); *G09G 2300/0426* (2013.01); *G09G 2300/0452* (2013.01); *G09G 2320/0209* (2013.01); *G09G 2320/0242* (2013.01); *G09G 2340/06* (2013.01)

(58) Field of Classification Search
CPC ............. G02F 1/136286; G02F 1/1368; G02F 1/134309; G02F 1/133514; G02F 1/134336; G02F 1/1343; G02F 1/13454; G02F 1/133; G02F 1/13306; G02F 1/1362; G02F 1/1335; G02F 1/141; G02F 2201/123; G02F 2201/52; G02F 2201/40; G02F 2001/134345; G02F 2001/136222
USPC ..... 345/690, 88, 87, 209, 204, 92, 213, 214, 345/55, 589; 349/37, 43, 106, 143, 144, 349/139, 33, 108
See application file for complete search history.

(56) References Cited

U.S. PATENT DOCUMENTS

| | | | |
|---|---|---|---|
| 7,986,377 B2 * | 7/2011 | Kim | ................. G02F 1/136213 349/139 |
| 8,587,504 B2 | 11/2013 | Joo | |
| 2011/0156992 A1 * | 6/2011 | Moon | ................. G09G 3/3607 345/84 |
| 2014/0232624 A1 | 8/2014 | Kim et al. | |

FOREIGN PATENT DOCUMENTS

| | | |
|---|---|---|
| KR | 10-2013-0000997 A | 1/2013 |
| KR | 10-2013-0098762 A | 9/2013 |
| KR | 10-1308452 B1 | 9/2013 |
| KR | 10-1345728 B1 | 12/2013 |
| KR | 10-2015-0139132 A | 12/2015 |

* cited by examiner

DISPLAY APPARATUS

CROSS-REFERENCE TO RELATED APPLICATION

This U.S. non-provisional patent application claims priority under 35 U.S.C. §119 to Korean Patent Application No. 10-2015-0026677 filed on Feb. 25, 2015, the contents of which are hereby incorporated by reference in their entirety.

BACKGROUND

1. Field of Disclosure

The present disclosure relates generally to flat panel displays. More particularly, the present disclosure relates to a flat panel display apparatus operated in an inversion driving scheme.

2. Description of the Related Art

A liquid crystal display forms an electric field in a liquid crystal layer disposed between two substrates, and this field changes an alignment of liquid crystal molecules of the liquid crystal layer to control a transmittance of light incident to the liquid crystal layer. In this manner, a desired image is displayed through the liquid crystal display.

Liquid crystal display driving methods are typically classified into line inversion methods, column inversion methods, and dot inversion methods according to a phase of a data voltage applied to data lines. The line inversion method inverts the phase of image data applied to data lines every pixel row, the column inversion method inverts the phase of the image applied to the data lines every pixel column, and the dot inversion method inverts the phase of the image data applied to the data lines every pixel row and every pixel column.

In general, a display apparatus displays colors using red, green, and blue colors as primary colors. Accordingly, the display apparatus includes pixels respectively corresponding to the red, green, and blue colors. In recent years, a display apparatus that displays images using red, green, blue, and white colors has been developed.

SUMMARY

The present disclosure provides a display apparatus capable of reducing or eliminating a horizontal crosstalk phenomenon and a moving line-stain phenomenon.

Embodiments of the inventive concept provide a display apparatus including a plurality of gate lines extending in a first direction, a plurality of data lines extending in a second direction crossing the first direction, and a plurality of pixels connected to the gate lines and the data lines. The pixels include pixels arranged in a k-th column between a k-th data line and a (k+1)th data line. The pixels in the k-th are arranged in a plurality of groups and each of the groups includes 2i first pixels connected to the k-th data line and 2i second pixels connected to the (k+1)th data line.

Successive ones of the pixels in each group are connected to the k-th data line and the (k+1)th data line, and each pixel has a width in the first direction that is greater than a width in the second direction.

Embodiments of the inventive concept also provide a display apparatus including a plurality of gate lines extending in a first direction, a plurality of data lines extending in a second direction crossing the first direction, and a plurality of pixels connected to the gate lines and the data lines, the plurality of pixels comprising at least first and second dots. The first dot includes first, second, and third pixels sequentially arranged in the first direction, and the second dot includes fourth, fifth, and sixth pixels sequentially arranged in the first direction. The pixels in a k-th column are arranged in groups of 4i pixels, the pixels of each group being connected to their two adjacent data lines in alternating manner.

According to the above, the horizontal crosstalk phenomenon and the moving line-stain phenomenon may be substantially improved. In addition, a flicker caused by brightness difference may be prevented from being perceived between frame periods.

BRIEF DESCRIPTION OF THE DRAWINGS

The above and other advantages of the present disclosure will become readily apparent by reference to the following detailed description when considered in conjunction with the accompanying drawings wherein:

FIG. 4A is a plan view showing a state in which first and second red pixels of FIG. 3 are turned on;

FIG. 4B is a plan view showing a state in which first and second green pixels of FIG. 3 are turned on;

FIG. 4C is a plan view showing a state in which first and second blue pixels of FIG. 3 are turned on;

FIG. 4D is a plan view showing a state in which all pixels shown in FIG. 3 are turned on;

FIG. 10A is a plan view showing a state in which red pixels of FIG. 9 are turned on;

FIG. 10B is a plan view showing a state in which green pixels of FIG. 9 are turned on;

FIG. 10C is a plan view showing a state in which blue pixels of FIG. 9 are turned on;

FIG. 10D is a plan view showing a state in which all pixels shown in FIG. 9 are turned on;

DETAILED DESCRIPTION

Hereinafter, the present invention will be explained in detail with reference to the accompanying drawings, which are not necessarily to scale. All numerical values are approximate, and may vary. All examples of specific materials and compositions are to be taken as nonlimiting and exemplary only. Other suitable materials and compositions may be used instead.

Figure 1:
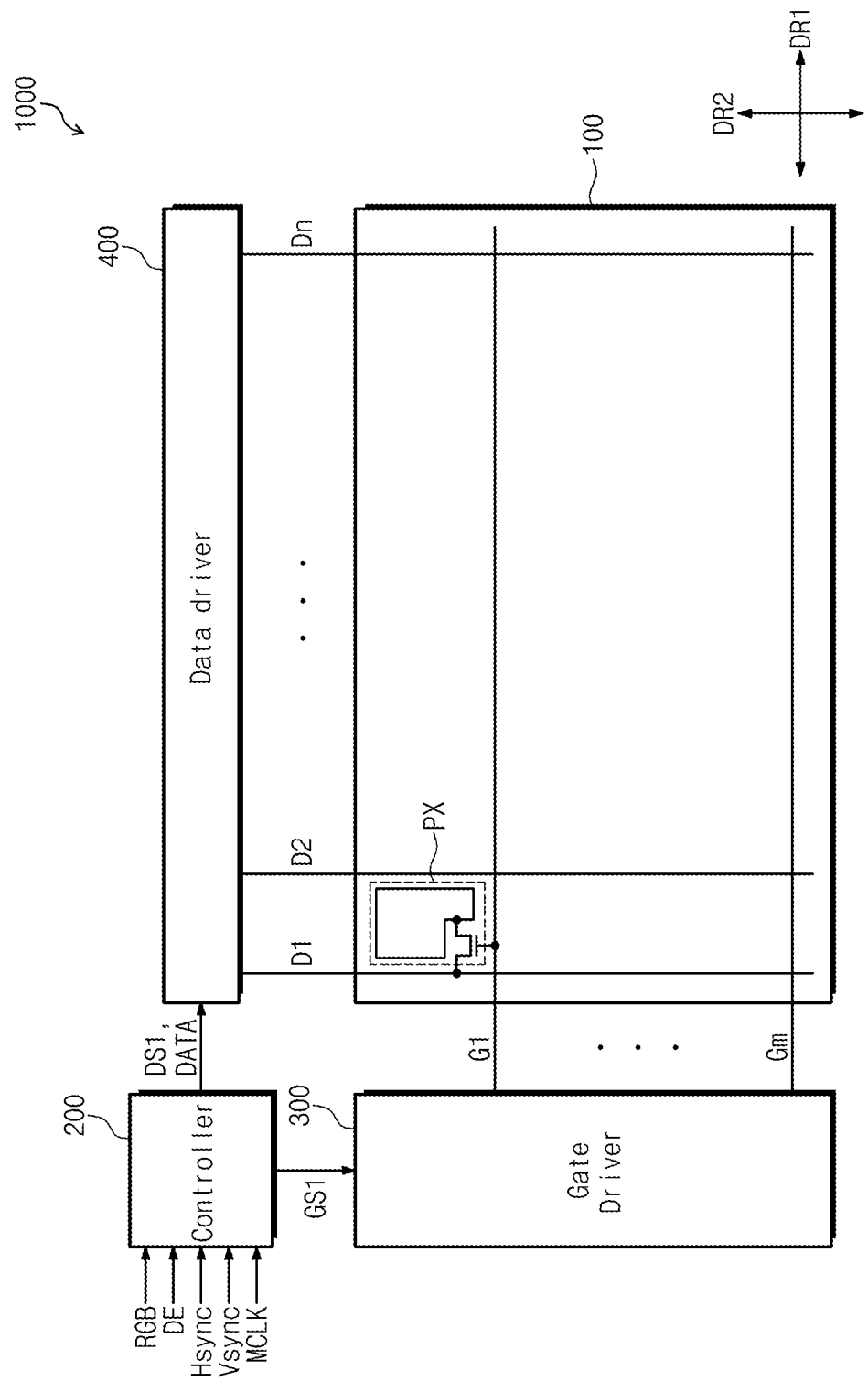
FIG. 1 is a block diagram showing a liquid crystal display apparatus according to an exemplary embodiment of the present disclosure.
Figure 2:
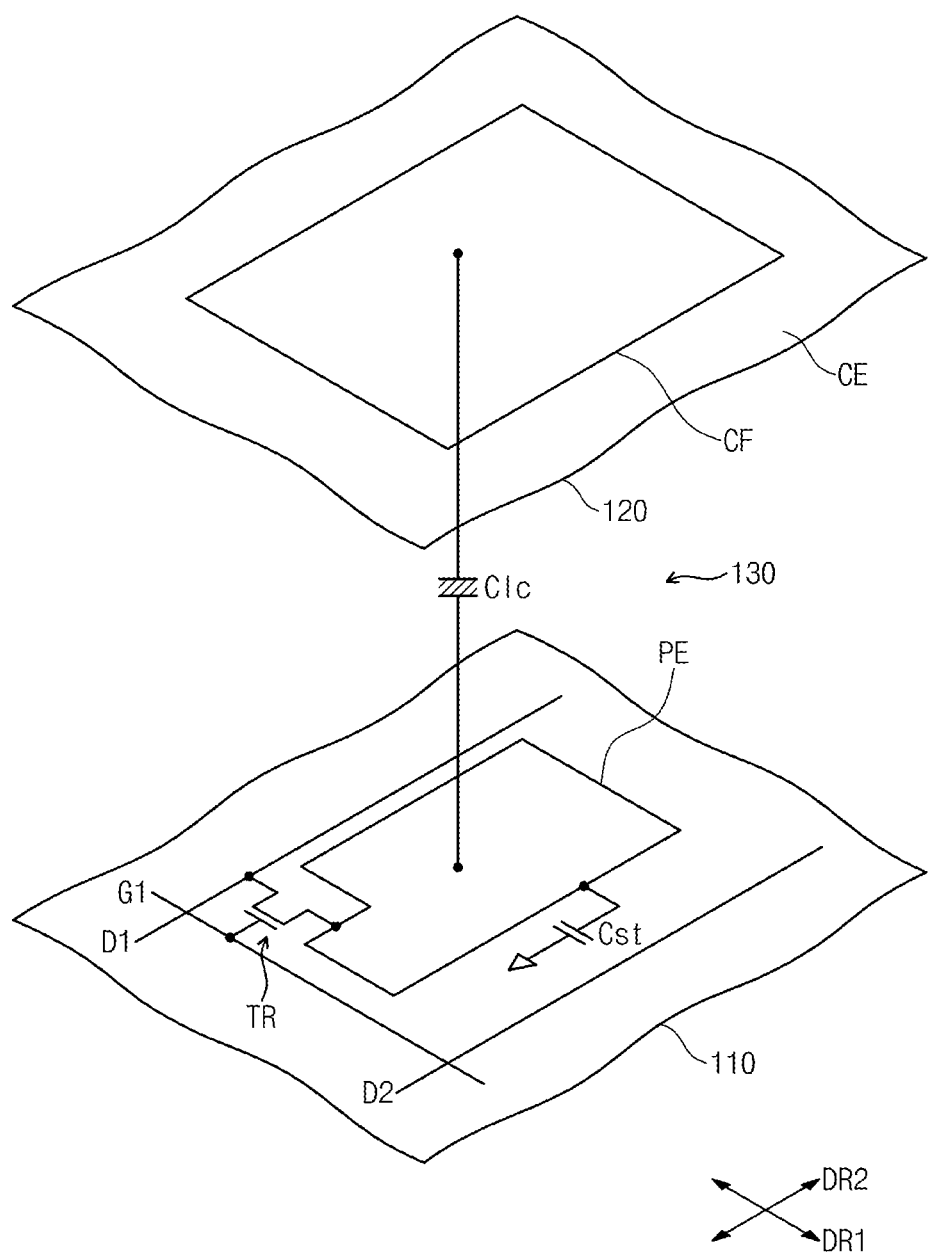
FIG. 2 is an equivalent circuit diagram for one pixel of FIG. 1.

FIG. 1 is a block diagram showing a liquid crystal display apparatus 1000 according to an exemplary embodiment of the present disclosure and FIG. 2 is an equivalent circuit diagram showing one pixel of FIG. 1.

Referring to FIG. 1, the liquid crystal display apparatus 1000 includes a liquid crystal panel 100, a controller 200, a gate driver 300, and a data driver 400.

The liquid crystal panel 100 includes a lower substrate 110, an upper substrate 120 facing the lower substrate 110, and a liquid crystal layer 130 interposed between the lower and upper substrates 110 and 120.

The liquid crystal panel 100 includes a plurality of gate lines G1 to Gm extending in a first direction DR1 and a plurality of data lines D1 to Dn extending in a second direction DR2 crossing the first direction DR1. The gate lines G1 to Gm and the data lines D1 to Dn define pixel areas, and pixels PX displaying an image are arranged in the pixel areas in a one-to-one correspondence. FIG. 1 shows one pixel from among the pixels PX. This particular pixel is arranged in a first row and a first column and is connected to a first gate line G1 among the gate lines G1 to Gm and a first data line D1 among the data lines D1 to Dn, as a representative example.

Referring to FIGS. 1 and 2, the pixel PX includes a thin film transistor TR connected to the first gate line G1 and the first data line D1, a liquid crystal capacitor Clc connected to the thin film transistor TR, and a storage capacitor Cst connected to the liquid crystal capacitor Clc in parallel. The storage capacitor Cst may be omitted if desired. The liquid crystal capacitor Clc includes a pixel electrode PE disposed on the lower substrate 110 and a common electrode CE disposed on the upper substrate 120 as its two terminals, and the liquid crystal layer 130 disposed between the pixel electrode PE and the common electrode CE serves as the dielectric of the liquid crystal capacitor Clc.

The thin film transistor TR may be disposed on the lower substrate 110. The thin film transistor TR includes a gate electrode connected to the first gate line G1, a source electrode connected to the first data line D1, and a drain electrode connected to the pixel electrode PE. The common electrode CE is disposed over an entire surface of the upper substrate 120 and receives a common voltage. Unlike the configuration shown in FIG. 2, the common electrode CE may be disposed on the lower substrate 110, and in this case, at least one of the pixel electrode PE and the reference electrode CE may include slits.

The storage capacitor Cst assists the liquid crystal capacitor Clc and includes the pixel electrode PE, a storage line (not shown), and an insulating layer disposed between the pixel electrode PE and the storage line (not shown). The storage line (not shown) is disposed on the lower substrate 110 to overlap a portion of the pixel electrode PE. The storage line (not shown) receives a constant voltage, such as a storage voltage.

Although not shown in FIG. 2, according to another embodiment, the display apparatus 1000 may have a structure in which each pixel PX is divided into two different grayscale areas. In this structure, each pixel PX includes at least two sub-pixels receiving data voltages based on differing gamma curves, and thus, the two sub-pixels display different grayscales with respect to the same input image data.

The pixels PX each display one of the primary colors. The primary colors include red, green, blue, and white colors. The pixels may however include any other primaries. For example, they may include yellow, cyan, and magenta colors. Each of the pixels may further include a color filter CF representing one of the primary colors. In FIG. 2, the color filter CF is disposed on the upper substrate 120, but it should not be limited thereto or thereby. That is, the color filter CF may be disposed on the lower substrate 110.

The controller 200 receives image data RGB and control signals from an external graphic controller (not shown). The control signals include a vertical synchronization signal Vsync as a frame distinction signal, a horizontal synchronization signal Hsync as a row distinction signal, a data enable signal maintained at a high level during a period in which data are output (so as to indicate a data input period), and a main clock signal MCLK.

The controller 200 converts the image data RGB to a format compatible with the data driver 400, and applies the converted image data DATA to the data driver 400. The controller 200 generates a gate control signal GS1 and a data control signal DS1. The controller 200 applies the gate control signals GS1 to the gate driver 300 and applies the data control signal DS1 to the data driver 400.

The gate control signal GS1 is used to drive the gate driver 300 and the data control signal DS1 is used to drive the data driver 400.

The gate driver 300 generates gate signals in response to the gate control signal GS1 and sequentially applies the gate signals to the gate lines G1 to Gm. The gate control signal GS1 includes a vertical start signal initiating scanning of the gate driver 300, at least one clock signal controlling an output timing of a gate-on voltage, and an output enable signal determining a duration of the gate-on voltage.

The data driver 400 converts the image data DATA to corresponding grayscale voltages in response to the data control signal DS1, and applies the grayscale voltages to the data lines D1 to Dn as the data voltages. The data voltages include a positive polarity (+) data voltage having a positive value with respect to the common voltage, and a negative polarity (−) data voltage having a negative value with respect to the common voltage. The data control signal DS1 includes a horizontal start signal STH initiating transmission of the image data DATA to the data driver 400, a load signal indicating application of the data voltages to the data lines D1 to Dn, and an inversion signal inverting the polarity of the data voltages with respect to the reference voltage.

The polarity of the data voltages applied to the pixels PX is inverted after one frame is finished and before a next frame starts, to prevent liquid crystal molecules from deteriorating and burning. That is, the polarity of the data voltage is inverted every frame in response to the inversion signal applied to the data driver 400. The liquid crystal panel 100 is operated in a manner in which data voltages having different polarities from each other are applied to the data lines D1 to Dn in units of at least one data line while the image corresponding to the one frame is displayed, and thus a display quality of the image is improved.

Each of the controller 200, the gate driver 300, and the data driver 400 is directly mounted on the liquid crystal panel 100 in at least one integrated circuit chip. This chip is connected to the liquid crystal panel 100 in a tape carrier package (TCP) manner after being mounted on a flexible printed circuit board, or mounted on a separate printed circuit board. Alternatively, the gate driver 300 may be directly integrated on the liquid crystal panel 100 together with the gate lines G1 to Gm, the data lines D1 to Dn, and the thin film transistor TR. In addition, the controller 200, the gate driver 300, and the data driver 400 may be integrated in a single chip.

Figure 3:
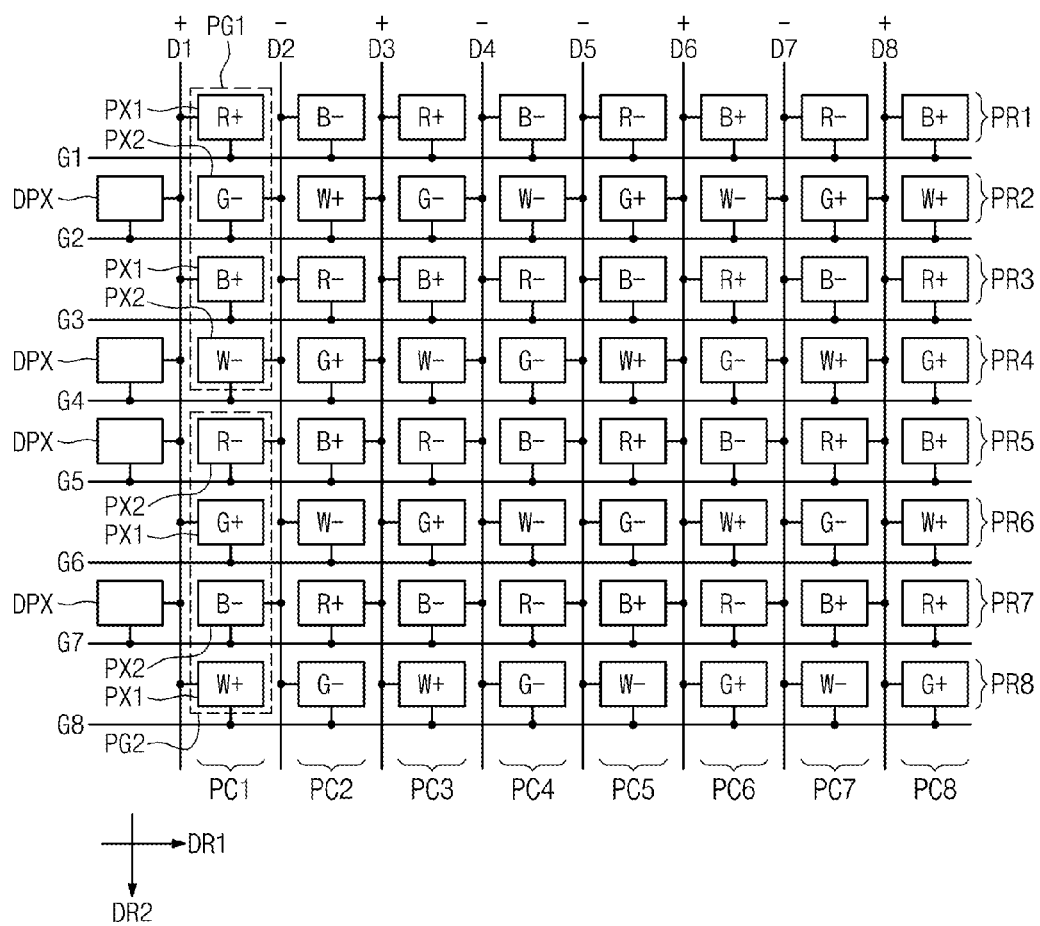
FIG. 3 is a plan view showing a portion of a liquid crystal panel according to an exemplary embodiment of the present disclosure.

FIG. 3 is a plan view showing a portion of a liquid crystal panel according to an exemplary embodiment of the present disclosure.

Referring to FIG. 3, the pixels includes pixels arranged in a k-th column (k is an integer number equal to or greater than 1) positioned between a k-th data line and a (k+1)th data line among the data lines D1 to Dn.

The pixels arranged in the k-th column are grouped into a plurality of groups consecutively arranged along the second direction DR2. Each group includes 2n first pixels PX1 (n is an integer number equal to or greater than 1) connected to the k-th data line and 2n second pixels PX2 connected to the (k+1)th data line. Each group includes an even number of pixels. Within each pixel group, the pixels arranged in the k-th column are alternately connected to the k-th data line and the (k+1)th data line, i.e. connected to both the k-th and (k+1)th data lines in a predetermined sequence.

Hereinafter, first, second, third, fourth, fifth, sixth, seventh, and eighth gate lines G1, G2, G3, G4, G5, G6, G7, and G8, first, second, third, fourth, fifth, sixth, seventh, and eighth data lines D1, D2, D3, D4, D5, D6, D7, and D8, and pixels PX(8×8) arranged in eight rows by eight columns and defined by the lines G1 to G8 and D1 to D8 will be described in detail with reference to FIGS. 3 and 5 to 8.

The pixels arranged in the eight rows PR1, PR2, PR3, PR4, PR5, PR6, PR7, and PR8 (hereinafter, referred to as first, second, third, fourth, fifth, sixth, seventh, and eighth pixel rows) are sequentially arranged along the second direction DR2, and the pixels arranged in the eight columns PC1, PC2, PC3, PC4, PC5, PC6, PC7, and PC8 (hereinafter, referred to as first, second, third, fourth, fifth, sixth, seventh, and eighth pixel columns) are sequentially arranged along the first direction DR1. The first to eighth pixel rows PR1 to PR8 are connected to the first to eighth gate lines G1 to G8 in a one-to-one correspondence.

The first pixel column PC1 is disposed between the first and second data lines D1 and D2, the second pixel column PC2 is disposed between the second and third data lines D2 and D3, and the third pixel column PC3 is disposed between the third and fourth data lines D3 and D4. Since the first to eighth columns PC1 to PC8 have substantially the same structure and function, hereinafter a connection structure of the first pixel column PC1 will be described in detail and detailed descriptions on the connection structures of the second to eighth pixel columns PC2 to PC8 will be omitted.

Each of the first to eighth pixel columns PC1 to PC8 includes groups PG1 and PG2 consecutively arranged along the second direction DR2. Each of the groups PG1 and PG2 of the first pixel column PC1 includes 2i (i is an integer number equal to or greater than 1) first pixels PX1 connected to the first data line D1 and 2i second pixels PX2 connected to the second data line D2. FIG. 3 shows the case of i=1 as a representative example. Each group PG1 and PG2 includes two first pixels PX1 and two second pixels PX2. Here, the first pixels PX1 of the first pixel column PC1 are connected to the first data line D1 and the second pixels PX2 of the first pixel column PC1 are connected to the second data line D2. The two first pixels PX1 included in each group may have different colors from each other, and the two second pixels PX2 included in each group may have different colors from each other.

The pixels of the first pixel column PC1 are alternately connected to the first and second data lines D1 and D2 within each group PG1 and PG2. As an example, a first group PG1 of the groups PG1 and PG2 includes two first pixels PX1 respectively arranged in the first and third pixel rows PR1 and PR3 and respectively connected to the first and third gate lines G1 and G3. The first group PG1 includes two second pixels PX2 respectively arranged in the second and fourth pixel rows PR2 and PR4 and respectively connected to the second and fourth gate lines G2 and G4. The second group PG2 of the groups PG1 and PG2 includes two first pixels PX1 respectively arranged in the sixth and eighth pixel rows PR6 and PR8 and respectively connected to the sixth and eighth gate lines G6 and G8. The second group PG2 includes two second pixels PX2 respectively arranged in the fifth and seventh pixel rows PR5 and PR7 and respectively connected to the fifth and seventh gate lines G5 and G7.

The order of the first and second pixels PX1 and PX2 is reversed by pixel group. That is, when the first pixels PX1 of the first group PG1 are arranged in odd-numbered pixel rows and the second pixels PX2 of the first group PG1 are arranged in even-numbered pixel rows, the first pixels PX1 of the second group PG2 are arranged in even-numbered pixel rows and the second pixels PX2 of the second group PG2 are arranged in odd-numbered pixel rows. As an example, the pixels PX1 and PX2 of the first group PG1 and the pixels PX2 and PX1 of the second group PG2 are arranged symmetrically with respect to the fourth gate line G4.

Accordingly, the first pixels PX1 are arranged in first, third, sixth, and eighth pixel rows PR1, PR3, PR6, and PR8 of each of the first to eighth pixel columns PC1 to PC8 and are connected to a left data line of the two data lines adjacent to their respective pixel columns. The second pixels PX2 are arranged in second, fourth, fifth, and seventh pixel rows PR2, PR4, PR5, and PR7 of each of the first to eighth pixel columns PC1 to PC8, and are connected to a right data line of the two data lines adjacent to their respective pixel columns.

First to eighth data voltages are applied to the first to eighth data lines D1 to D8, and each of the first to eighth data voltages has a positive (+) or negative (−) polarity with respect to the common voltage applied to the common electrode CE (refer to FIG. 2). FIG. 3 shows the polarity of the data voltages applied to the pixels in a j-th (j is an integer number equal to or greater than 1) frame, and thus the polarity of the data voltages applied to the pixels in a (j+1)th frame is inverted. That is, the data driver 400 shown in FIG. 1 inverts the polarity of the data voltages applied to the data lines D1 to Dn every frame.

The polarity of the first to eighth data voltages is inverted in the unit of 2z data lines in the first direction DR1. In detail, when the z=2 in FIG. 3, the first to fourth data voltages respectively applied to the first to fourth data lines D1 to D4 have the polarities of +, −, +, and −, respectively, and the fifth to eighth data voltages respectively applied to the fifth to eighth data lines D5 to D8 have the polarities of −, +, −, and +, respectively. Therefore, the first, third, sixth, and eighth data lines D1, D3, D6, and D8 receive a positive polarity (+) data voltage and the second, fourth, fifth, and seventh data lines D2, D4, D5, and D7 receive a negative polarity (−) data voltage.

The pixels of each of the first to eighth pixel columns PC1 to PC8 are repeatedly arranged in groupings of four colors, along the second direction DR2. Thus, among the pixels of each of the first to eighth pixel columns PC1 to PC8, the pixels of the first and fifth pixel rows PR1 and PR5 have the same color, the pixels of the second and sixth pixel rows PR2 and PR6 have the same color, the pixels of the third and seventh pixel rows PR3 and PR7 have the same color, and the pixels of the fourth and eighth pixel rows PR4 and PR8 have the same color.

As an example, the pixels in the first and fifth pixel rows PR1 and PR5 of the first, third, fifth, and seventh pixel columns PC1, PC3, PC5, and PC7 have a red color (R), and the pixels in the second and sixth pixel rows PR2 and PR6 of the first, third, fifth, and seventh pixel columns PC1, PC3, PC5, and PC7 have a green color (G). The pixels in the third and seventh pixel rows PR3 and PR7 of the first, third, fifth, and seventh pixel columns PC1, PC3, PC5, and PC7 have a blue color (B), and the pixels in the fourth and eighth pixel rows PR4 and PR8 of the first, third, fifth, and seventh pixel columns PC1, PC3, PC5, and PC7 have a white color (W).

The pixels in the first and fifth pixel rows PR1 and PR5 of the second, fourth, sixth, and eighth pixel columns PC2, PC4, PC6, and PC8 have the blue color (B), and the pixels in the second and sixth pixel rows PR2 and PR6 of the second, fourth, sixth, and eighth pixel columns PC2, PC4, PC6, and PC8 have the white color (W). The pixels in the third and seventh pixel rows PR3 and PR7 of the second, fourth, sixth, and eighth pixel columns PC2, PC4, PC6, and PC8 have a red color (R), and the pixels in the fourth and eighth pixel rows PR4 and PR8 of the second, fourth, sixth, and eighth pixel columns PC2, PC4, PC6, and PC8 have the green color (G).

In FIG. 3, the pixels having the red color, the pixels having the green color, the pixels having the blue color, and the pixels having the white color are represented by R, G, B, and W, respectively. In addition, the pixels receiving the positive polarity (+) data voltage are represented by R+, G+, B+, and W+, respectively, and the pixels receiving the negative polarity (−) data voltage are represented by R−, G−, B−, and W−, respectively.

The arrangement order of the pixels should not be limited to that shown in FIG. 3. That is, positions of the red, green, blue, and white pixels R, B, and W may vary in any manner. As an example, the pixels of each pixel row may be arranged in repeating pairs of the same color, or the pixels of each pixel column may be arranged in repeating groups of four pixels of the same color.

A first red pixel R+ of the first group PG1 of the first pixel column PC1 is connected to the first data line D1, and a second red pixel R− of the second group PG2 of the first pixel column PC1 is connected to the second data line D2. A first green pixel G− of the first group PG1 of the first pixel column PC1 is connected to the second data line D2, and a second green pixel G+ of the second group PG2 of the first pixel column PC1 is connected to the first data line D1. A first blue pixel B+ of the first group PG1 of the first pixel column PC1 is connected to the first data line D1, and a second blue pixel B− of the second group PG2 of the first pixel column PC1 is connected to the second data line D2. A first white pixel W− of the first group PG1 of the first pixel column PC1 is connected to the second data line D2, and a second white pixel W+ of the second group PG2 of the first pixel column PC1 is connected to the first data line D1.

Accordingly, the polarity of the data voltages applied to the pixels displaying a first color in the first group PG1 of the first pixel column PC1 is different from the polarity of the data voltages applied to the pixels displaying the first color in the second group PG2 of the first pixel column PC1. The first color may be one of the red, green, blue, and white colors. In this embodiment, polarity is inverted every four data lines. That is, each group of four successive data lines has the opposite polarities as its adjacent groups. When pixels are also connected to the data lines as above, three columns of four pixel columns have same-color pixels receiving data voltages of both polarities, and one column of the four pixel columns has same color receiving data voltages of only one polarity. That is, within the four successive pixel columns, three of these columns apply data voltages of two polarities different to each color, while the fourth column only applies data voltages of a single polarity.

In the present exemplary embodiment, dummy pixels DPX may be disposed adjacent to the second pixels PX2 of the first pixel column PC1. The dummy pixels DPX are connected to the first data line D1. The dummy pixels DPX are disposed adjacent to the second pixels PX2 of the first pixel column PC1 and adjacent to the first pixels PX1 of the last pixel column.

Therefore, the dummy pixels DPX connected to the first data line D1 are positioned in odd-numbered pixel rows, and the dummy pixels DPX connected to the last data line Dn are positioned in even-numbered pixel rows.

The red, green, blue, and white pixels R, G, B, and W are arranged in repeating order on the liquid crystal panel 110 along the second direction D2. Each of the red, green, blue, and white pixels R, G, B, and W has a horizontal pixel structure in which a width (hereinafter, referred to as a horizontal width) in the first direction D1 is greater than a width (hereinafter, referred to as a vertical width) in the second direction D2. In the present exemplary embodiment, a ratio of the horizontal width to the vertical width is in a range of from 2:1 to 3:1.

Figure 4A:
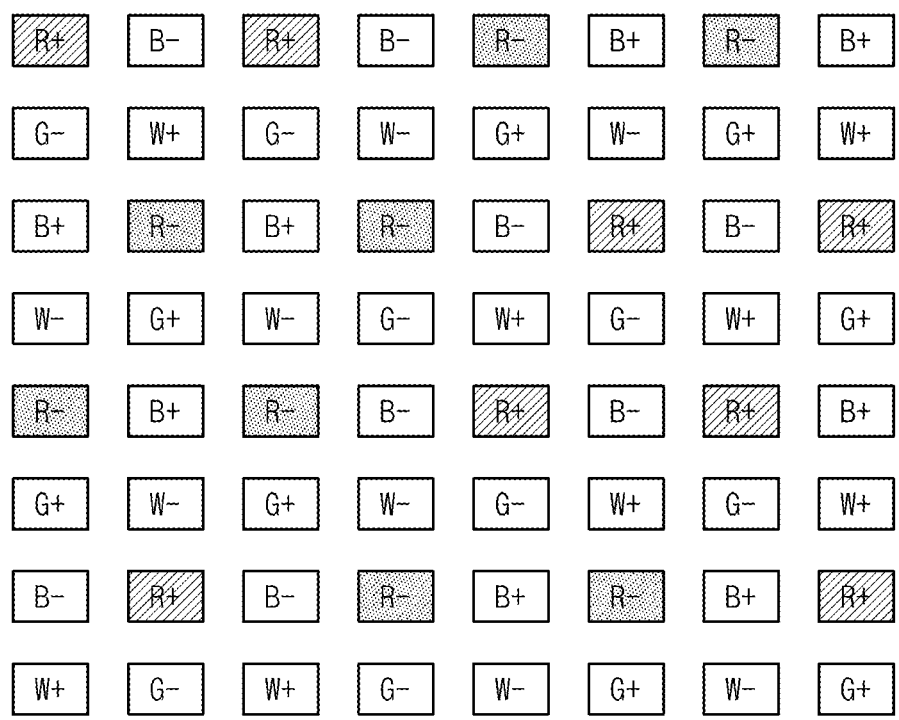
Figure 4A:
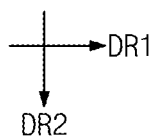
Figure 4B:
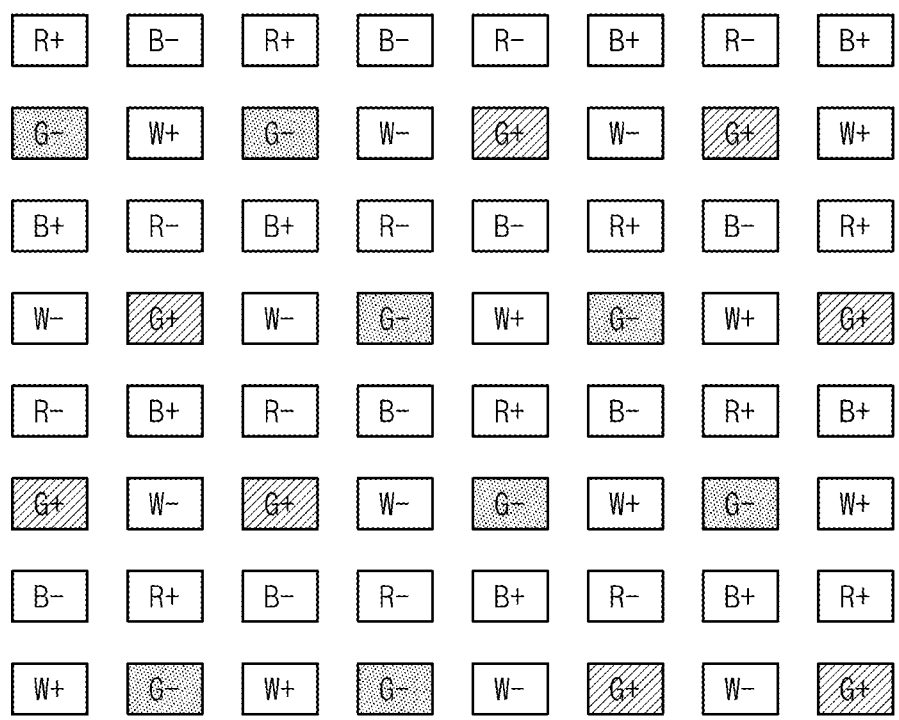
Figure 4B:
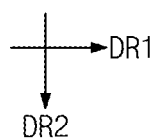
Figure 4C:
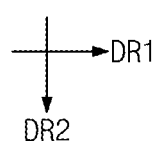
Figure 4D:
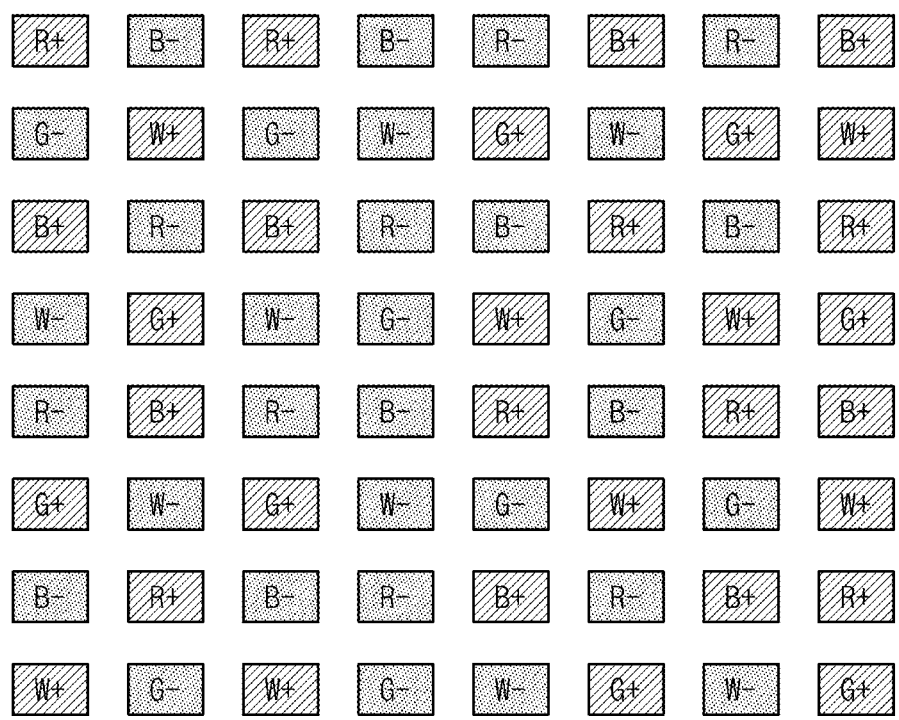
Figure 4D:
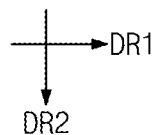

FIG. 4A is a plan view showing a state in which the first and second red pixels among the pixels shown in FIG. 3 are turned on, FIG. 4B is a plan view showing a state in which the first and second green pixels among the pixels shown in FIG. 3 are turned on, FIG. 4C is a plan view showing a state in which the first and second blue pixels among the pixels shown in FIG. 3 are turned on, and FIG. 4D is a plan view showing a state in which all pixels shown in FIG. 3 are turned on.

Referring to FIG. 4A, the first and second red pixels R+ and R− receive data voltages having the same grayscale but different polarities. However, although the data voltages have the same grayscale, a difference in voltage between the positive polarity (+) data voltage and the negative polarity (−) data voltage occurs due to a kickback voltage. Due to this difference in voltage, a difference in brightness occurs between the first and second red pixels R+ and R−. For convenience in explanation, the first and second red pixels R+ and R− are represented by different hatchings in FIG. 4A.

When a sum of polarities of the data voltages applied to the pixels arranged in the same pixel row is biased to the positive (+) polarity or the negative (−) polarity, a phenomenon, in which the common voltage ripples to a positive direction or a negative direction due to a coupling phenomenon between the common electrode and the data lines, occurs.

However, as shown in FIG. 4A, the first and second red pixels R+ and R− are repeatedly arranged in the first direction DR1. That is, in a single pixel row, the number of first red pixels R+ receiving the positive polarity (+) data voltage is equal to the number of second red pixels R− receiving the negative polarity (−) data voltage. For pixels displaying other colors, e.g., green, blue, and white colors, the number of pixels receiving the positive polarity (+) data voltage is equal to the number of pixels receiving the negative polarity (−) data voltage in each pixel row. Accordingly, the common voltage is prevented from being rippled to the positive or negative direction with respect to the reference voltage, and thus horizontal crosstalk is prevented from occurring.

The first and second red pixels R+ and R− are arranged in repeating manner along the second direction DR2. That is, the number of the first red pixels R+ receiving the positive data voltage is equal to the number of the second red pixels R− receiving the negative data voltage in one pixel column. For pixels displaying other colors, e.g., green, blue, and white colors, the number of pixels receiving the positive polarity (+) data voltage is equal to the number of pixels receiving the negative polarity (−) data voltage in each pixel column. Accordingly, brightness difference is prevented from occurring between the pixel columns, and thus the moving line-stain, in which a vertical line is perceived when the i-th frame is changed to the (i−1)th frame, is prevented from occurring.

Similarly, the first and second green pixels G+ and G− are arranged in repeating manner along the first and second directions DR1 and DR2 and the first and second blue pixels B+ and B− are also arranged in repeating manner along the first and second directions DR1 and DR2 as shown in FIGS. 4B and 4C. Therefore, brightness difference is prevented from occurring between different pixel rows and between different pixel columns, and thus horizontal crosstalk and moving line-stains are prevented from occurring.

As described above, the positive and negative pixels displaying the red, green, blue, and white pixels are arranged in repeating manner along the pixel rows and the pixel columns, and the number of positive pixels is equal to the number of negative pixels with respect to each of the red, green, blue, and white pixels. Thus, although all pixels are substantially and simultaneously operated as shown in FIG. 4D, brightness difference does not occur between the pixel rows and the pixel columns. As a result, the horizontal crosstalk phenomenon and the moving line-stain phenomenon may be prevented from occurring.

Figure 5:
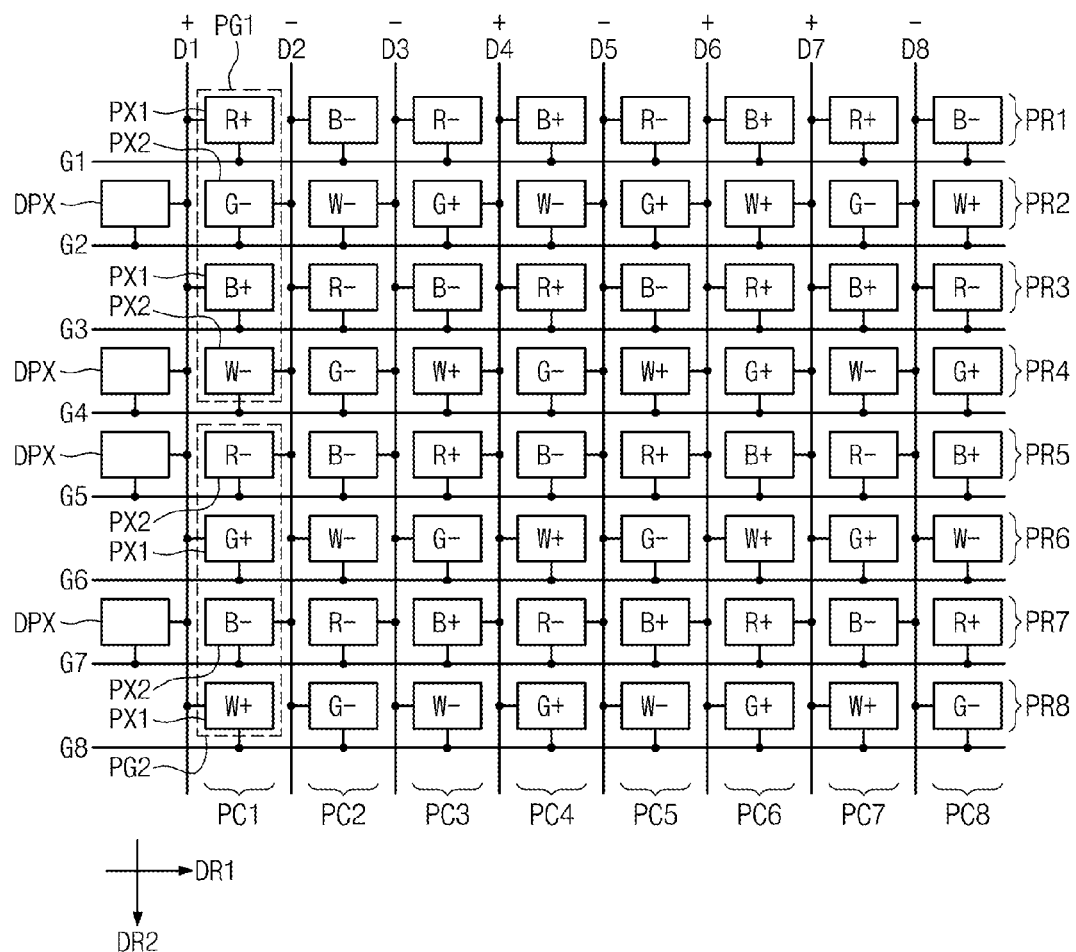
FIG. 5 is a plan view showing a portion of a liquid crystal panel according to another exemplary embodiment of the present disclosure.

FIG. 5 is a plan view showing a portion of a liquid crystal panel according to another exemplary embodiment of the present disclosure.

Referring to FIG. 5, the first to fourth data voltages respectively applied to the first to fourth data lines D1 to D4 have polarities of +, −, −, and +, respectively, and the fifth to eighth data voltages respectively applied to the fifth to eighth data lines D5 to D8 have polarities of −, +, +, and −, respectively. Therefore, the first, fourth, sixth, and seventh data lines D1, D4, D6, and D7 receive a positive polarity (+) data voltage and the second, third, fifth, and eighth data lines D2, D3, D5, and D8 receive a negative polarity (−) data voltage.

The pixels of each of the first to eighth pixel columns PC1 to PC8 are repeatedly arranged in groupings of four colors along the second direction DR2. These groupings are arranged so that the pixels of each of the pixel rows are arranged in repeating patterns of two colors. Accordingly, among the pixels of each of the first to eighth pixel columns PC1 to PC8, the pixels of the first and fifth pixel rows PR1 and PR5 have the same colors, the pixels of the second and sixth pixel rows PR2 and PR6 have the same colors, the pixels of the third and seventh pixel rows PR3 and PR7 have the same colors, and the pixels of the fourth and eighth pixel rows PR4 and PR8 have the same colors.

As an example, the pixels arranged in the first and fifth pixel rows PR1 and PR5 of the first, third, fifth, and seventh pixel columns PC1, PC3, PC5, and PC7 have a red color (R), and the pixels arranged in the second and sixth pixel rows PR2 and PR6 of the first, third, fifth, and seventh pixel columns PC1, PC3, PC5, and PC7 have a green color (G). The pixels arranged in the third and seventh pixel rows PR3 and PR7 of the first, third, fifth, and seventh pixel columns PC1, PC3, PC5, and PC7 have a blue color (B), and the pixels arranged in the fourth and eighth pixel rows PR4 and PR8 of the first, third, fifth, and seventh pixel columns PC1, PC3, PC5, and PC7 have a white color (W). The pixels arranged in the first and fifth pixel rows PR1 and PR5 of the second, fourth, sixth, and eighth pixel columns PC2, PC4, PC6, and PC8 have the blue color (B), and the pixels arranged in the second and sixth pixel rows PR2 and PR6 of the second, fourth, sixth, and eighth pixel columns PC2, PC4, PC6, and PC8 have the white color (W). The pixels arranged in the third and seventh pixel rows PR3 and PR7 of the second, fourth, sixth, and eighth pixel columns PC2, PC4, PC6, and PC8 have the red color (R), and the pixels arranged in the fourth and eighth pixel rows PR4 and PR8 of the second, fourth, sixth, and eighth pixel columns PC2, PC4, PC6, and PC8 have the green color (G).

The first red pixel R+ of the first group PG1 of the first pixel column PC1 is connected to the first data line D1, and the second red pixel R− of the second group PG2 of the first pixel column PC1 is connected to the second data line D2. The first green pixel G+ of the first group PG1 of the first pixel column PC1 is connected to the second data line D2, and the second green pixel G+ of the second group PG2 of the first pixel column PC1 is connected to the first data line D1. The first blue pixel B+ of the first group PG1 of the first pixel column PC1 is connected to the first data line D1, and the second blue pixel B− of the second group PG2 of the first pixel column PC1 is connected to the second data line D2. The first white pixel W+ of the first group PG1 of the first pixel column PC1 is connected to the second data line D2, and the second white pixel W+ of the second group PG2 of the first pixel column PC1 is connected to the first data line D1.

Accordingly, the polarity of the data voltages applied to the pixels displaying a first color in the first group PG1 of the first pixel column PC1 is different from the polarity of the data voltages applied to the pixels displaying the first color in the second group PG2 of the first pixel column PC1. Here, the first color may be one of red, green, blue, and white. In the configuration of the present embodiment, three columns of four pixel columns have same-color pixels receiving data voltages of both polarities, and one column of the four pixel columns has same color receiving data voltages of only one polarity. As shown in FIG. 5, among the first to fourth pixel columns PC1 to PC4, the pixels arranged in the first, third, and fourth pixel columns PC1, PC3, and PC4 receive data voltages of two different polarities, while the pixels of the second pixel column PC2 all receive data voltages of a single polarity.

Figure 6:
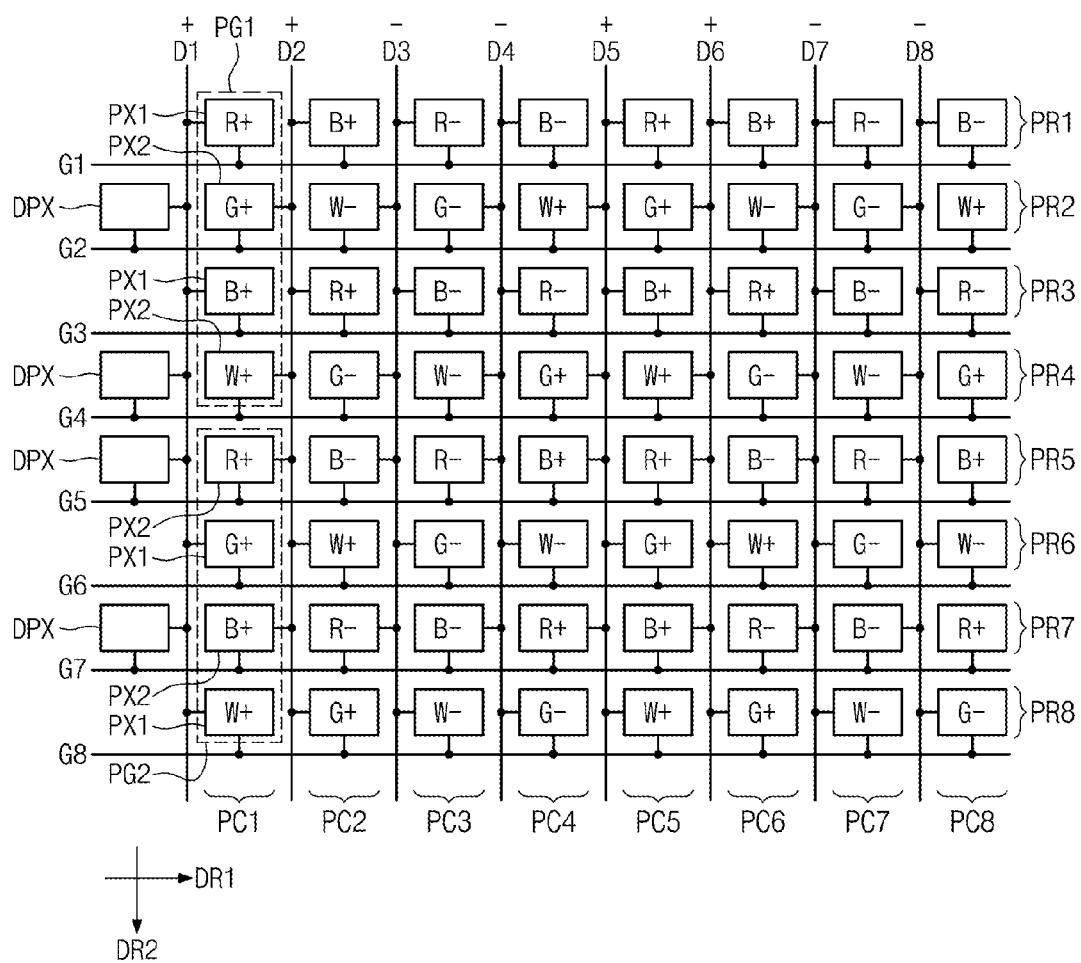
FIG. 6 is a plan view showing a portion of a liquid crystal panel according to another exemplary embodiment of the present disclosure.

FIG. 6 is a plan view showing a portion of a liquid crystal panel according to another exemplary embodiment of the present disclosure.

Referring to FIG. 6, the first to fourth data voltages respectively applied to the first to fourth data lines D1 to D4 have polarities of +, +, −, and −, respectively, and the fifth to eighth data voltages respectively applied to the fifth to eighth data lines D5 to D8 also have polarities of +, +, −, and − respectively. Therefore, the first, second, fifth, and sixth data lines D1, D2, D5, and D6 receive a positive polarity (+) data voltage and the third, fourth, seventh, and eighth data lines D3, D4, D7, and D8 receive a negative polarity (−) data voltage.

The pixels are arranged in a repeating pattern of two colors in each pixel row and are arranged in a two-color repeating pattern in each pixel column, although the two patterns are different.

As an example, the pixels arranged in the first and fifth pixel rows PR1 and PR5 of the first, third, fifth, and seventh pixel columns PC1, PC3, PC5, and PC7 have a red color (R), and the pixels arranged in the second and sixth pixel rows PR2 and PR6 of the first, third, fifth, and seventh pixel columns PC1, PC3, PC5, and PC7 have a green color (G). The pixels arranged in the third and seventh pixel rows PR3 and PR7 of the first, third, fifth, and seventh pixel columns PC1, PC3, PC5, and PC7 have a blue color (B), and the pixels arranged in the fourth and eighth pixel rows PR4 and PR8 of the first, third, fifth, and seventh pixel columns PC1, PC3, PC5, and PC7 have a white color (W). The pixels arranged in the first and fifth pixel rows PR1 and PR5 of the second, fourth, sixth, and eighth pixel columns PC2, PC4, PC6, and PC8 have the blue color (B), and the pixels arranged in the second and sixth pixel rows PR2 and PR6 of the second, fourth, sixth, and eighth pixel columns PC2, PC4, PC6, and PC8 have the white color (W). The pixels arranged in the third and seventh pixel rows PR3 and PR7 of the second, fourth, sixth, and eighth pixel columns PC2, PC4, PC6, and PC8 have the red color (R), and the pixels arranged in the fourth and eighth pixel rows PR4 and PR8 of the second, fourth, sixth, and eighth pixel columns PC2, PC4, PC6, and PC8 have the green color (G).

The first red pixel R+ of the first group PG1 of the second pixel column PC2 is connected to the second data line D2, and the second red pixel R− of the second group PG2 of the second pixel column PC2 is connected to the third data line D3. The first green pixel G− of the first group PG1 of the second pixel column PC2 is connected to the third data line D3, and the second green pixel G+ of the second group PG2 of the second pixel column PC2 is connected to the second data line D2. The first blue pixel B+ of the first group PG1 of the second pixel column PC2 is connected to the second data line D2, and the second blue pixel B− of the second group PG2 of the second pixel column PC2 is connected to the third data line D3. The first white pixel W− of the first group PG1 of the second pixel column PC2 is connected to the third data line D3, and the second white pixel W+ of the second group PG2 of the second pixel column PC2 is connected to the second data line D2.

Accordingly, the polarity of the data voltages applied to the pixels displaying a first color in the first group PG1 of the second pixel column PC2 is different from the polarity of the data voltages applied to the pixels displaying the first color in the second group PG2 of the second pixel column PC2. The first color may be red, green, blue, or white, for example. In the configuration of the present embodiment, two columns of four pixel columns have same-color pixels receiving data voltages of both polarities, and two columns of the four pixel columns have same color receiving data voltages of only one polarity. As shown in FIG. 6, among the first to fourth pixel columns PC1 to PC4, the pixels arranged in the second and fourth pixel columns PC2 and PC4 receive data voltages of two different polarities, while the pixels of columns PC1 and PC3 receive data voltages of a single polarity.

In FIGS. 3 to 6, the polarity of the data voltages applied to the data lines is inverted in units of four data lines, i.e. data voltage polarity is inverted every four data lines, but it should not be limited thereto or thereby. As another example, the polarity of the data voltages applied to the data lines may be inverted every two data lines.

Figure 7:
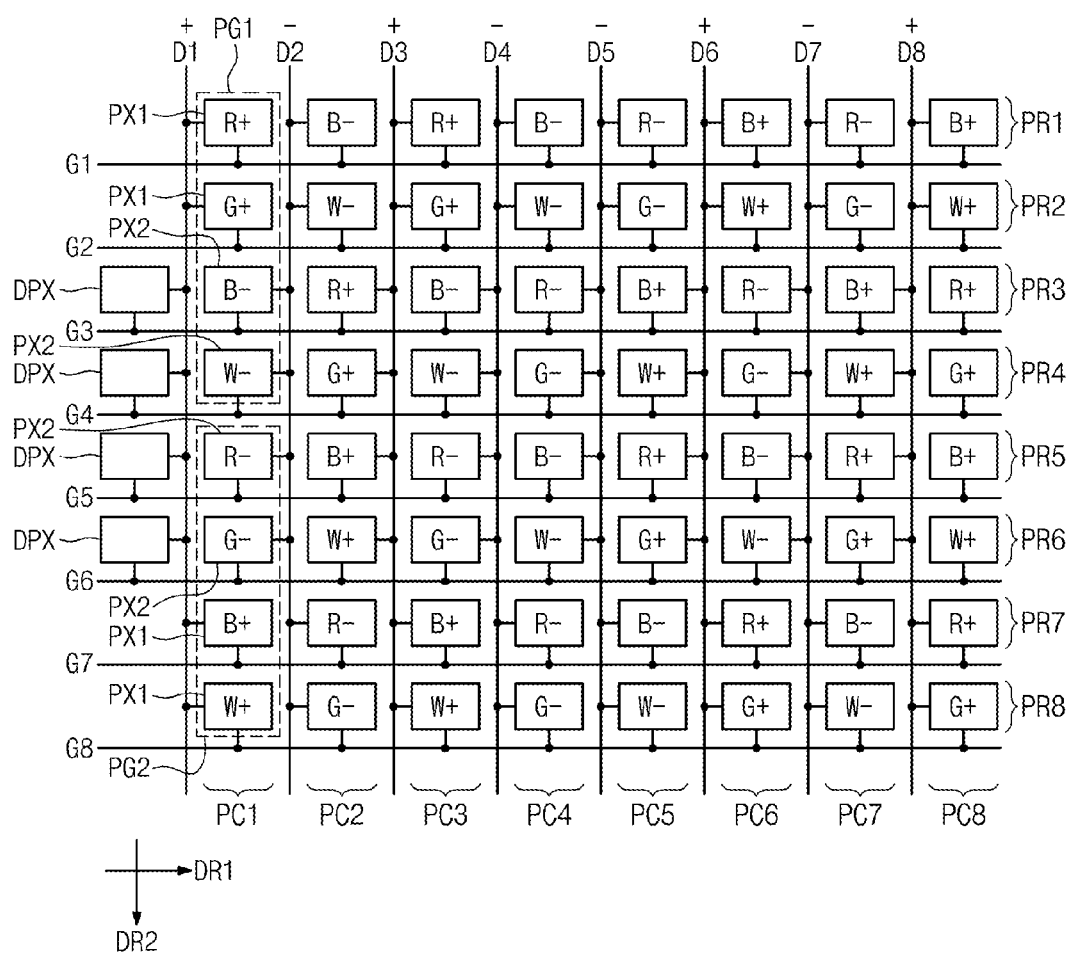
FIG. 7 is a plan view showing a portion of a liquid crystal panel according to another exemplary embodiment of the present disclosure.

FIG. 7 is a plan view showing a portion of a liquid crystal panel according to another exemplary embodiment of the present disclosure.

Referring to FIG. 7, each of the first to eighth pixel columns PC1 to PC8 includes a plurality of groups consecutively arranged along the second direction DR2. Each of the groups of the first pixel column PC1 includes 2i first pixels PX1 connected to the first data line D1 and 2i second pixels PX2 connected to the second data line D2. FIG. 7 shows the pixels when i=1 as a representative example. Each group includes two first pixels PX1 and two second pixels PX2.

Within one group, the pixels of the first pixel column PC1 are pairwise-alternately connected to the first and second data lines D1 and D2. Among the pixel groups, a first group PG1 includes the first pixels PX1 respectively arranged in the first and second pixel rows PR1 and PR2 and the second pixels PX2 respectively arranged in the third and fourth pixel rows PR3 and PR4. A second group PG2 includes the first pixels PX1 respectively arranged in the seventh and eighth pixel rows PR7 and PR8 and the second pixels PX2 respectively arranged in the fifth and sixth pixel rows PR5 and PR6. The order of the first and second pixels PX1 and PX2 is reversed from one group to the next. As an example, the arrangement of connections between the pixels of the first group PG1 and the first and second data lines D1 and D2 may be symmetric with the connections between the pixels of the second group PG2 and the first and second data lines D1 and D2, with respect to the gate line G4.

FIG. 7 shows the first pixel column PC1 as a representative example, but other pixel columns PC2 to PC8 have the same structure as that of the first pixel column PC1. Accordingly, the pixels arranged in the first, second, seventh, and eighth pixel rows PR1, PR2, PR7, and PR8 of each of the first to eighth pixel columns PC1 to PC8 are connected to the leftmost of their two respective adjacent data lines, and the pixels arranged in the third, fourth, fifth, and sixth pixel rows PR3, PR4, PR5, and PR6 of each of the first to eighth pixel columns PC1 to PC8 are connected to the rightmost of their two respective adjacent data lines.

In the present exemplary embodiment, dummy pixels DPX may be disposed adjacent to the second pixels PX2 of the third, fourth, fifth, and sixth pixel rows PR3, PR4, PR5, and PR6 of the first pixel column PC1. The dummy pixels DPX are connected to the first data line D1. The dummy pixels DPX are disposed adjacent to the second pixels PX2 of the first pixel column PC1, and may also be disposed adjacent to the first pixels PX1 of the last pixel column.

Therefore, the dummy pixels DPX shown in FIG. 7 are arranged in the third, fourth, fifth, and sixth pixel rows PR3, PR4, PR5, and PR6.

Since the color arrangements of the pixels shown in FIG. 7 are substantially the same as the color arrangements of the pixels shown in FIGS. 3, 5, and 6, detailed descriptions of the color arrangements of the pixels shown in FIG. 7 will be omitted.

Figure 8:
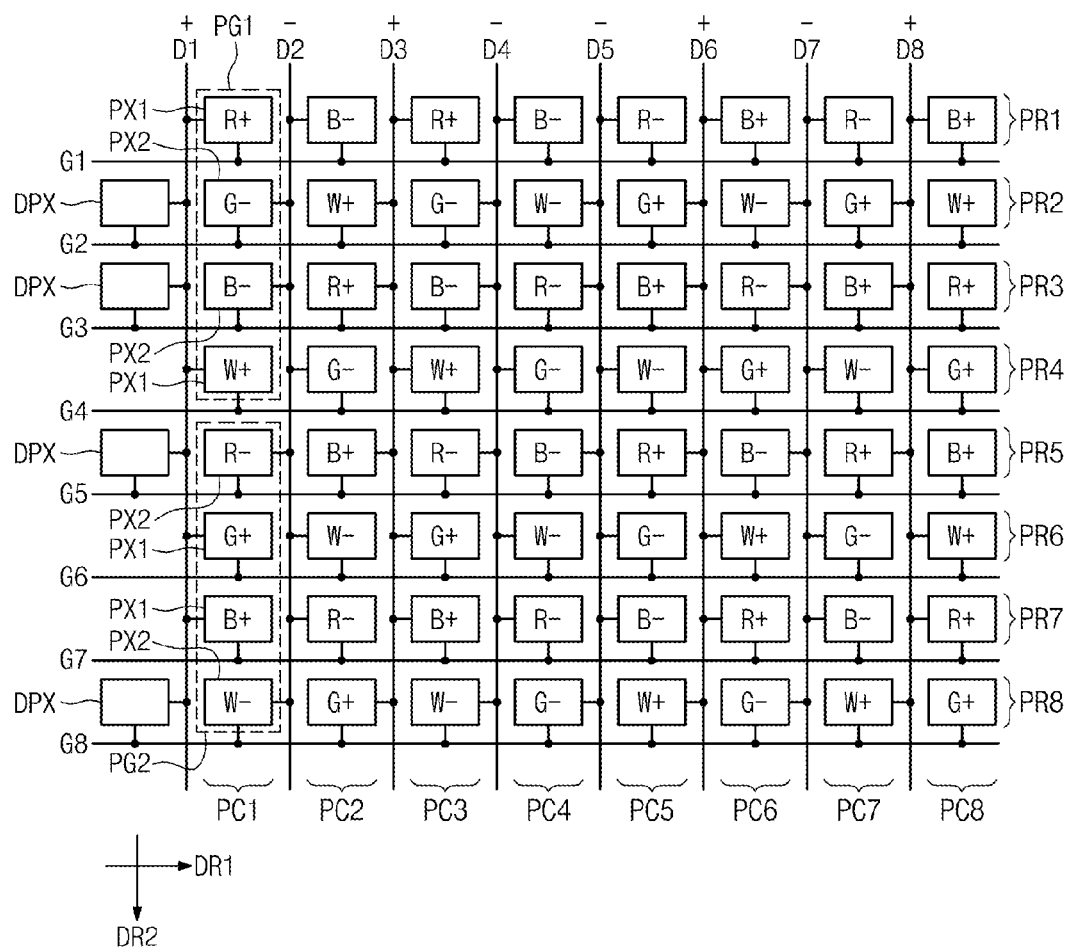
FIG. 8 is a plan view showing a portion of a liquid crystal panel according to another exemplary embodiment of the present disclosure.

FIG. 8 is a plan view showing a portion of a liquid crystal panel according to another exemplary embodiment of the present disclosure.

Referring to FIG. 8, each of the first to eighth pixel columns PC1 to PC8 includes a plurality of pixel groups consecutively arranged along the second direction DR2. Each of the groups of the first pixel column PC1 includes two first pixels PX1 connected to the first data line D1 and two second pixels PX2 connected to the second data line D2.

The pixels of the first pixel column PC1 are organized into pixel groups. Within each group, pixels are alternately connected to the first and second data lines D1 and D2. Within groups, a first group PG1 includes the first pixels PX1 respectively arranged in the first and fourth pixel rows PR1 and PR4 and the second pixels PX2 respectively arranged in the second and third pixel rows PR2 and PR3. A second pixel group PG2 includes the first pixels PX1 respectively arranged in the sixth and seventh pixel rows PR6 and PR7 and the second pixels PX2 respectively arranged in the fifth and eighth pixel rows PR5 and PR8. The order of second pixels PX1 and PX2 are inverted in successive groups. As an example, the connection structure between the pixels of the first group PG1 and the first and second data lines D1 and D2 may be the inverse of the connection structure between the pixels of the second group PG2 and the first and second data lines D1 and D2, with respect to the fourth gate line G4.

FIG. 8 shows the first pixel column PC1 as a representative example, but other pixel columns PC2 to PC8 have the same structure as that of the first pixel column PC1. Accordingly, the pixels arranged in the first, fourth, sixth, and seventh pixel rows PR1, PR4, PR6, and PR7 of each of the first to eighth pixel columns PC1 to PC8 are connected to a left data line of their two respective adjacent data lines, and the pixels arranged in the second, third, fifth, and eighth pixel rows PR2, PR3, PR5, and PR8 of each of the first to eighth pixel columns PC1 to PC8 are connected to a right data line of their two respective adjacent data lines.

In the present exemplary embodiment, dummy pixels DPX may be disposed adjacent to the second pixels PX2 of the second, third, fifth, and eighth pixel rows PR2, PR3, PR5, and PR8 of the first pixel column PC1. The dummy pixels DPX are connected to the first data line D1. The dummy pixels DPX are disposed adjacent to the second pixels PX2 of the first pixel column PC1, and are also disposed adjacent to the first pixels PX1 of the last pixel column without being disposed in any other pixel column.

Therefore, the dummy pixels DPX shown in FIG. 8 may be arranged in the second, third, fifth, and eighth pixel rows PR2, PR3, PR5, and PR8.

Figure 9:
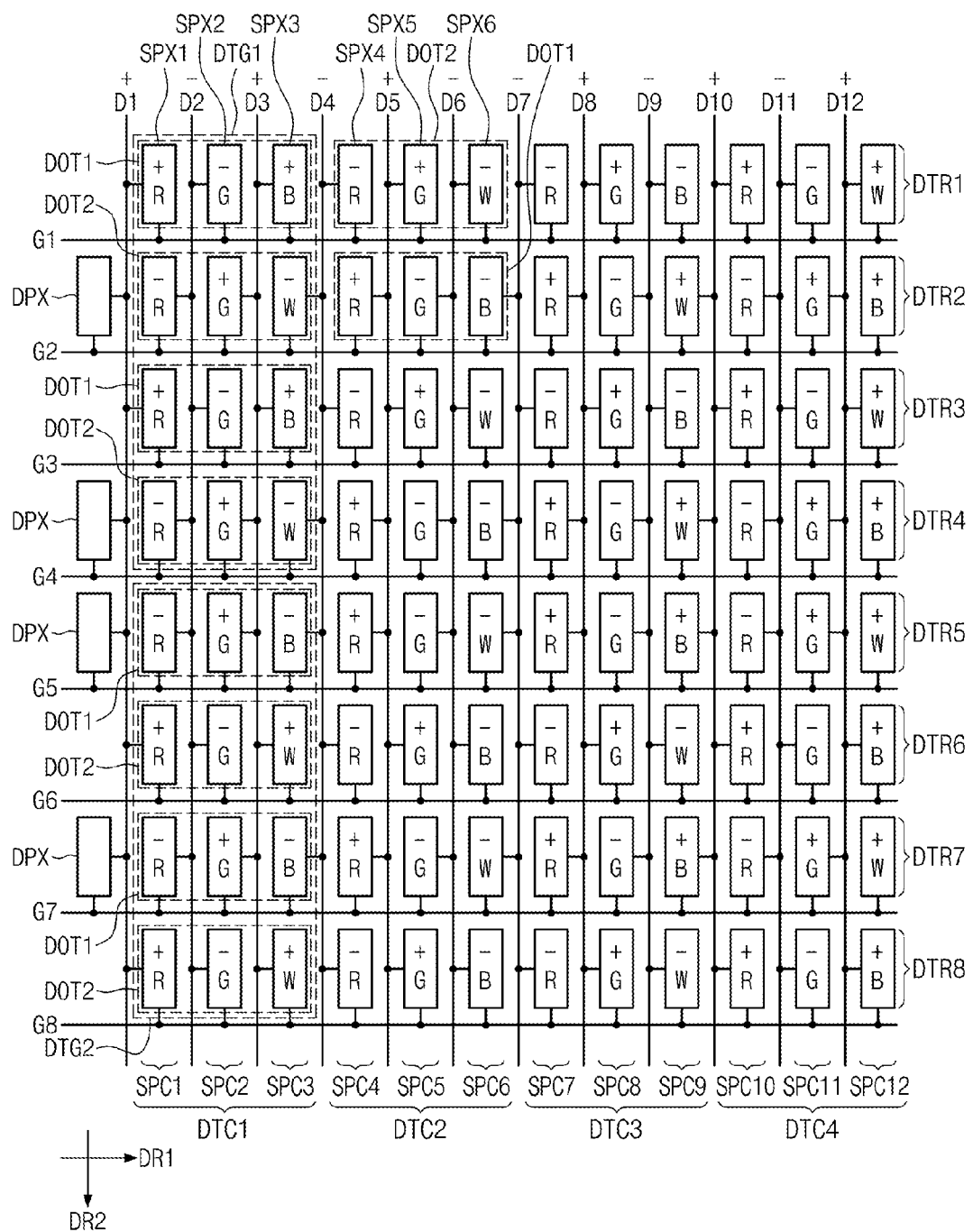
FIG. 9 is a plan view showing a portion of a liquid crystal panel according to another exemplary embodiment of the present disclosure.

FIG. 9 is a plan view showing a portion of a liquid crystal panel according to another exemplary embodiment of the present disclosure.

Referring to FIG. 9, a display apparatus according to the present exemplary embodiment includes first and second dots DOT1 and DOT2. The first dot DOT1 includes first, second, and third pixels SPX1, SPX2, and SPX3 and the second dot DOT2 includes fourth, fifth, and sixth pixels SPX4, SPX5, and SPX6. The first and second dots DOT1 and DOT2 are alternately arranged along both of the first and second directions DR1 and DR2. Each of the first and second dots DOT1 and DOT2 includes three pixels and displays color image information through the three pixels.

The first, second, and third pixels SPX1, SPX2, and SPX3 are sequentially arranged along the first direction DR1 in the first dot DOT1. As an example, the first pixel SPX1 displays a first color, e.g., a red color R, the second pixel SPX2 displays a second color, e.g., a green color G, and the third pixel SPX3 displays a third color, e.g., a blue color B. A ratio of the horizontal width to the vertical width of each of the first to third pixels SPX1 to SPX3 is approximately 1:3.

The fourth, fifth, and sixth pixels SPX4, SPX5, and SPX6 are sequentially arranged along the first direction DR1 in the second dot DOT2. As an example, the fourth pixel SPX4 displays a fourth color, e.g., a red color R, the fifth pixel SPX5 displays a fifth color, e.g., a green color G, and the sixth pixel SPX6 displays a sixth color, e.g., a white color W.

In FIG. 9, the dots DOT(8×4) arranged in eight rows by four columns defined by first, second, third, fourth, fifth, sixth, seventh, and eighth gate lines G1, G2, G3, G4, G5, G6, G7, and G8 and first, second, third, fourth, fifth, sixth, seventh, eighth, ninth, tenth, eleventh, and twelfth data lines D1, D2, D3, D4, D5, D6, D7, D8, D9, D10, D11, and D12 will be described.

The dots DTR1, DTR2, DTR3, DTR4, DTR5, DTR6, DTR7, and DTR8 arranged in the eight rows (hereinafter, referred to as first, second, third, fourth, fifth, sixth, seventh, and eighth dot rows) are sequentially arranged along the second direction DR2, and the dots DTC1, DTC2, DTC3, and DTC4 arranged in the four columns (hereinafter, referred to as first, second, third, and fourth dot columns) are sequentially arranged along the first direction DR1. The first to eighth dot rows DTR1 to DTR8 are connected to the first to eighth gate lines G1 to G8 in a one-to-one correspondence. In odd-numbered dot columns DTC1 and DTC3, the first dots DOT1 are disposed in odd-numbered dot rows DTR1, DTR3, DTR5, and DTR7 and the second dots DOT2 are disposed in even-numbered dot rows DTR2, DTR4, DTR6, and DTR8. In even-numbered dot columns DTC2 and DTC4, the first dots DOT1 are disposed in the even-numbered dot rows DTR2, DTR4, DTR6, and DTR8 and the second dots DOT2 are disposed in the odd-numbered dot rows DTR1, DTR3, DTR5, and DTR7.

Each of the first to fourth dot columns DTC1 to DTC4 includes a plurality of first dot groups DTG1 and a plurality of second dot groups DTG2, which are alternately arranged along the second direction DR2. Each of the first dot groups DTG1 includes two first dots DOT1 and two second dots DOT2, and each of the second dot groups DTG2 includes two first dots DOT1 and two second dots DOT2.

The first dot column DTC1 includes a first pixel column SPC1 in which the first and fourth pixels SPX1 and SPX4 are alternately arranged along the second direction DR2, a second pixel column SPC2 in which the second and fifth pixels SPX2 and SPX5 are alternately arranged along the second direction DR2, and a third pixel column SPC3 in which the third and sixth pixels SPX3 and SPX6 are alternately arranged along the second direction DR2.

In the first dot column DTC1, the first dot DOT1 of the first dot group DTG1 includes first, second, and third pixels SPX1, SPX2, and SPX3 respectively connected to the first, second, and third data lines D1, D2, and D3, and the second dot DOT2 of the first dot group DTG1 includes fourth, fifth, and sixth pixels SPX4, SPX5, and SPX6 respectively connected to the second, third, and fourth data lines D2, D3, and D4. In the first dot column DTC1, the first dot DOT1 of the second dot group DTG2 includes first, second, and third pixels SPX1, SPX2, and SPX3 respectively connected to the second, third, and fourth data lines D2, D3, and D4, and the second dot DOT2 of the second dot group DTG2 includes fourth, fifth, and sixth pixels SPX4, SPX5, and SPX6 respectively connected to the first, second, and third data lines D1, D2, and D3.

The second dot column DTC2 includes a fourth pixel column SPC4 in which the fourth and first pixels SPX4 and SPX1 are alternately arranged along the second direction DR2, a fifth pixel column SPC5 in which the fifth and second pixels SPX5 and SPX2 are alternately arranged along the second direction DR2, and a sixth pixel column SPC6 in which the sixth and third pixels SPX6 and SPX3 are alternately arranged along the second direction DR2.

In the second dot column DTC2, the first dot DOT1 of the first dot group DTG1 includes first, second, and third pixels SPX1, SPX2, and SPX3 respectively connected to the fifth, sixth, and seventh data lines D5, D6, and D7, and the second dot DOT2 of the first dot group DTG1 includes fourth, fifth, and sixth pixels SPX4, SPX5, and SPX6 respectively connected to the fourth, fifth, and sixth data lines D4, D5, and D6. In the second dot column DTC2, the first dot DOT1 of the second dot group DTG2 includes first, second, and third pixels SPX1, SPX2, and SPX3 respectively connected to the fourth, fifth, and sixth data lines D4, D5, and D6, and the second dot DOT2 of the second dot group DTG2 includes fourth, fifth, and sixth pixels SPX4, SPX5, and SPX6 respectively connected to the fifth, sixth, and seventh data lines D5, D6, and D7.

First to twelfth data voltages are respectively applied to the first to twelfth data lines D1 to D12 and each of the first to twelfth data voltages has a positive (+) or negative (−) polarity with respect to the reference voltage applied to the common electrode CE (refer to FIG. 2). FIG. 9 shows the polarity of the data voltages applied to the pixels in an i-th frame, and thus the polarity of the data voltages applied to the pixels in an (i+1)th frame is inverted. That is, the data driver 400 shown in FIG. 1 inverts the polarity of the data voltages applied to the data lines D1 to Dn every frame.

The polarity of the first to twelfth data voltages is inverted every 6j data lines in the first direction DR1. In detail, when j=1 in FIG. 9, the first to sixth data voltages respectively applied to the first to sixth data lines D1 to D6 have the polarities of +, −, +, −, +, and −, respectively, and the seventh to twelfth data voltages respectively applied to the seventh to twelfth data lines D7 to D12 have the polarities of −, +, −, +, −, and +, respectively. Therefore, the first, third, fifth, eighth, tenth, and twelfth data lines D1, D3, D5, D8, D10, and D12 receive a positive polarity (+) data voltage and the second, fourth, sixth, seventh, ninth, and eleventh data lines D2, D4, D6, D7, D9, and D11 receive a negative polarity (−) data voltage.

In FIG. 9, the positive polarity (+) data voltages are represented by R+, G+, B+, and W+ and the negative polarity (−) data voltages are represented by R−, G−, B−, and W−. The arrangement order of the pixels should not be limited to that shown in FIG. 9.

The pixels arranged in the first and fourth pixel columns SPC1 and SPC4 have the red color R, the pixels arranged in the second and fifth pixel columns SPC2 and SPC5 have the green color G, and the pixels arranged in the third and sixth pixel columns SPC3 and SPC6 have the blue or white color B or W.

The first pixels SPX1 included in the first dot group DTG1 and the first pixel column SPC1 are connected to the first data line D1 to receive the positive polarity red data voltage R+. The fourth pixels SPX4 included in the first dot group DTG1 and the first pixel column SPC1 are connected to the second data line D2 to receive the negative polarity red data voltage R−. The first pixels SPX1 included in the second dot group DTG2 and the first pixel column SPC1 are connected to the second data line D2 to receive the negative red data voltage R−. The fourth pixels SPX4 included in the second dot group DTG2 and the first pixel column SPC1 are connected to the first data line D1 to receive the positive polarity red data voltage R+. The second and third pixel columns SPC2 and SPC3 have a similar connection structure to that of the first pixel column SPC1 except for the colors.

Accordingly, the polarity of the data voltages applied to the pixels displaying a first color in the first dot DOT1 of the first dot group DTG1 is different from the polarity of the data voltages applied to the pixels displaying the first color in the first dot DOT1 of the second dot group DTG2. The polarity of the data voltages applied to the pixels displaying the second, third, and fourth colors becomes different in accordance with the dot groups in which the pixels displaying the second, third, and fourth colors are included.

In the present exemplary embodiment, dummy pixels DPX may be disposed adjacent to the second dots DOT2 of the first dot group DTG1 and the first dot column DTC1, and are also disposed adjacent to the first dots DOT1 of the second dot group DTG2 of the first dot column DTC1. The dummy pixels DPX are connected to the first data line D1. Although not shown in figures, the dummy pixels DPX may also be disposed adjacent to the first dots DOT1 and/or the second dots DOT2 of the last pixel column.

Figure 10A:
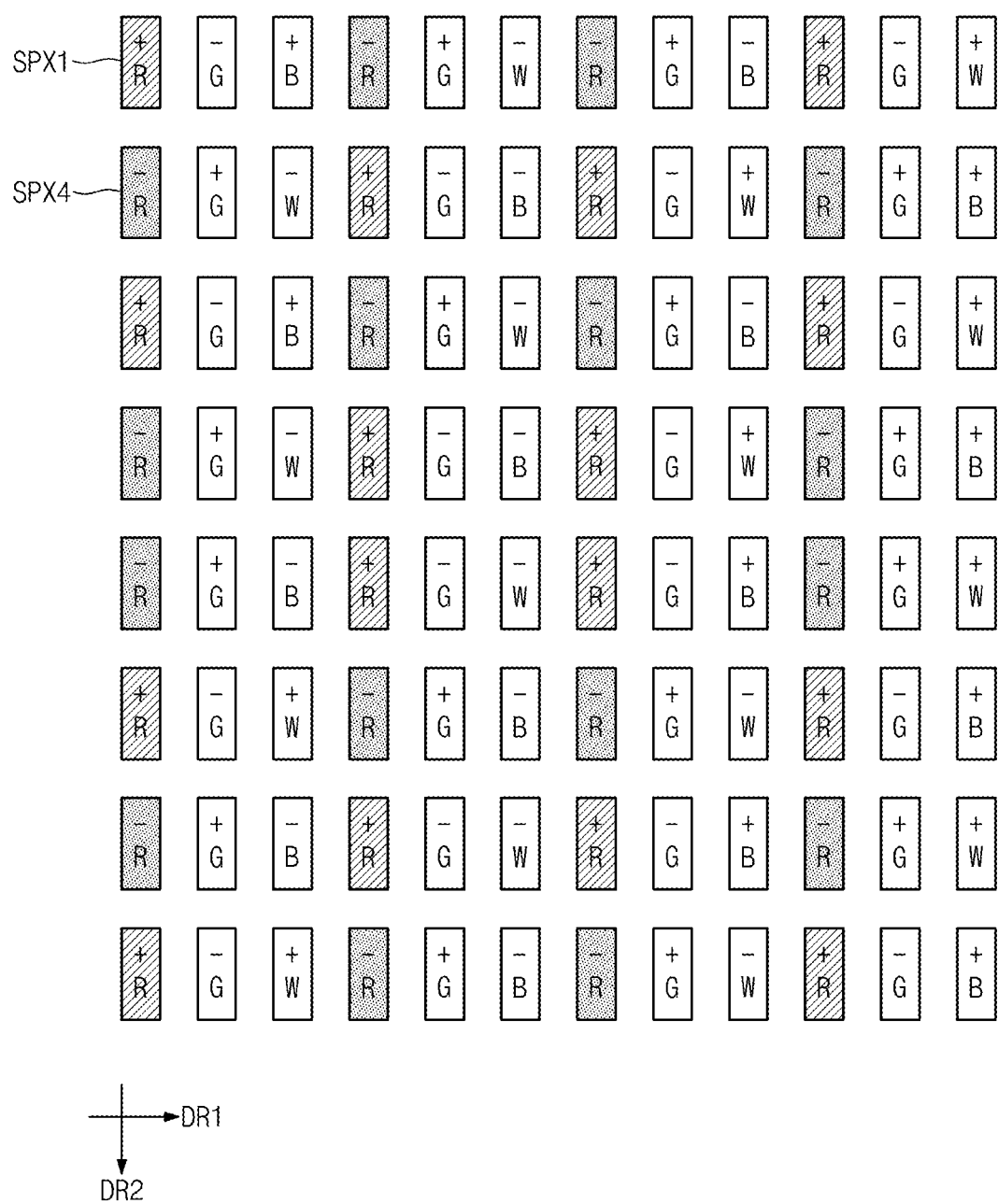
Figure 10B:
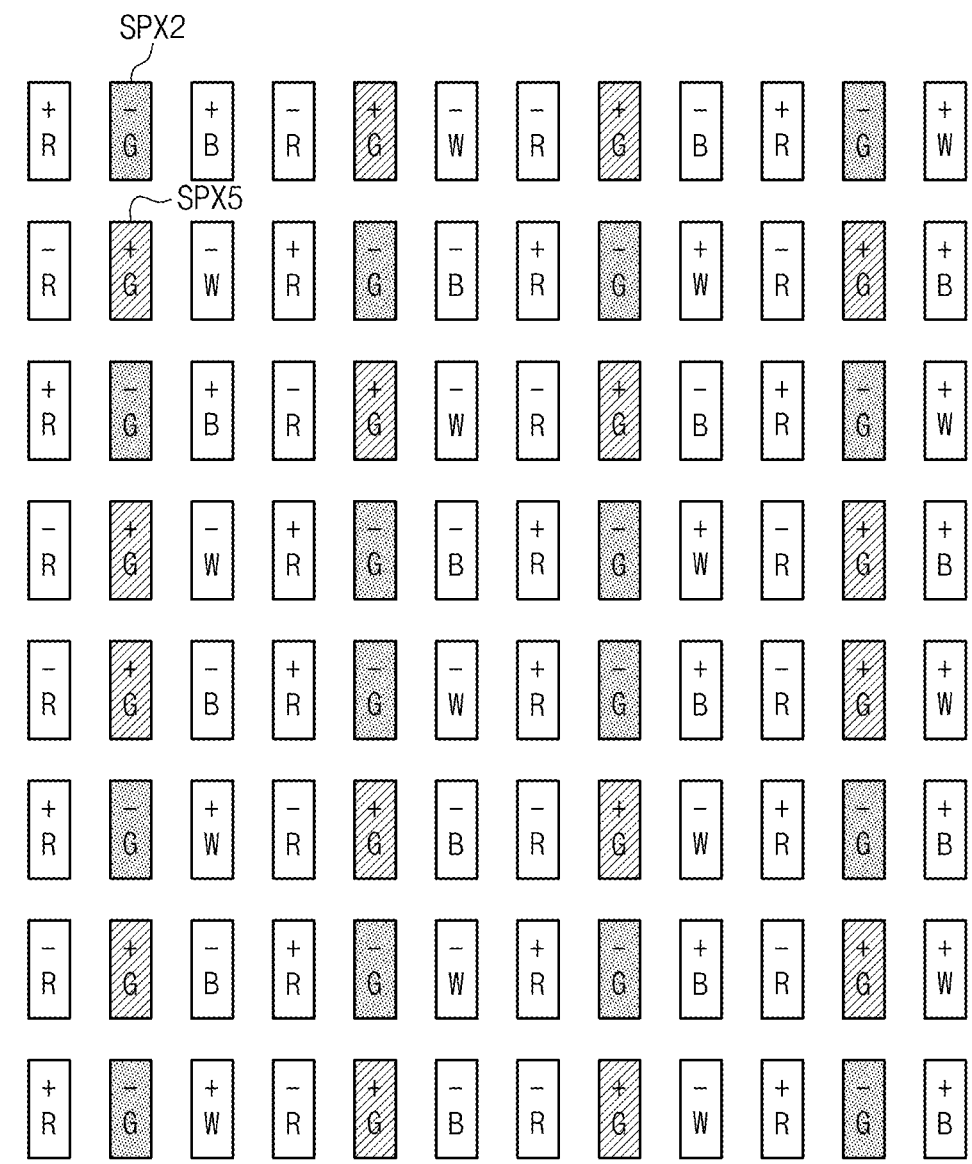
Figure 10C:
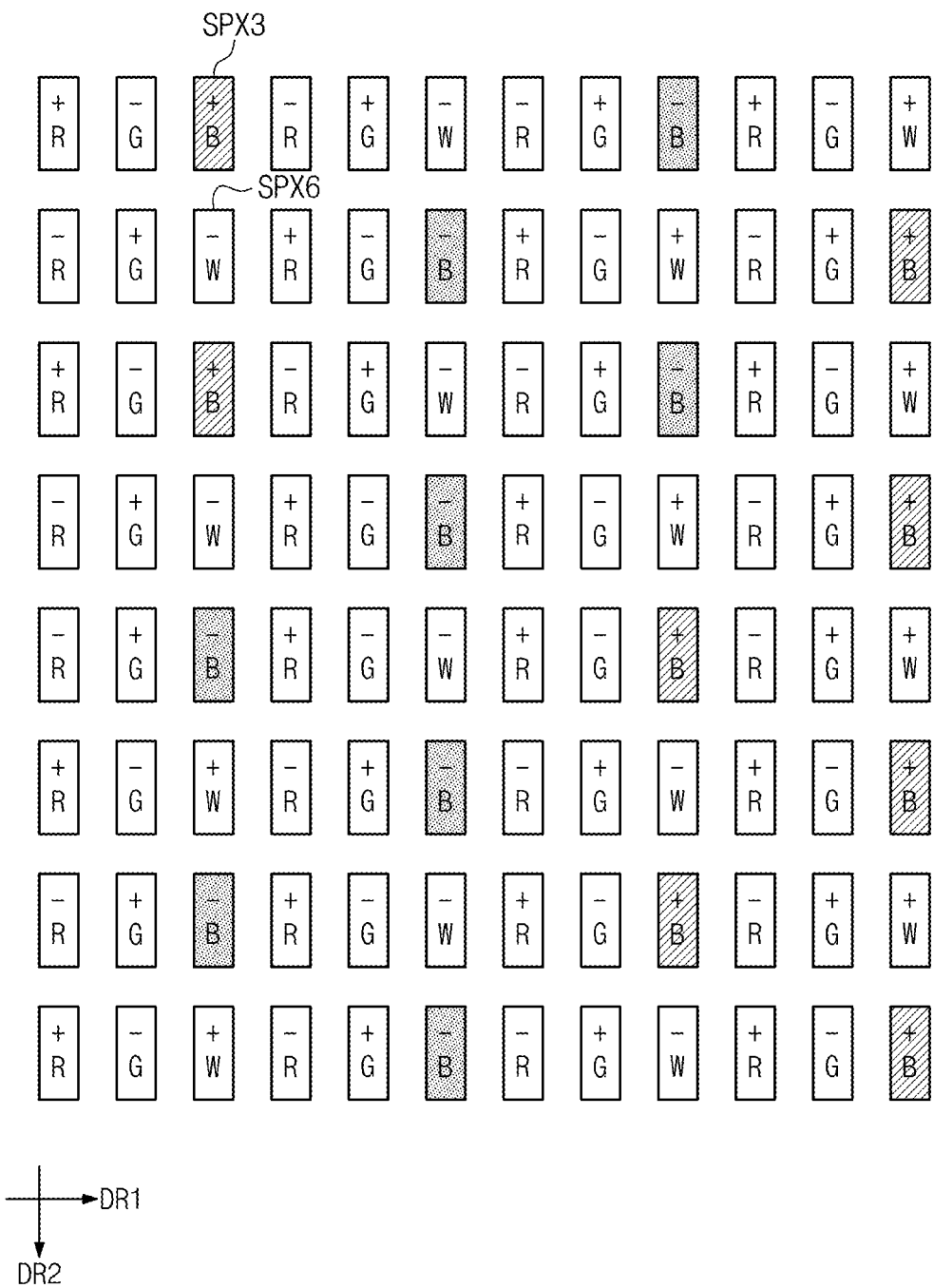
Figure 10D:
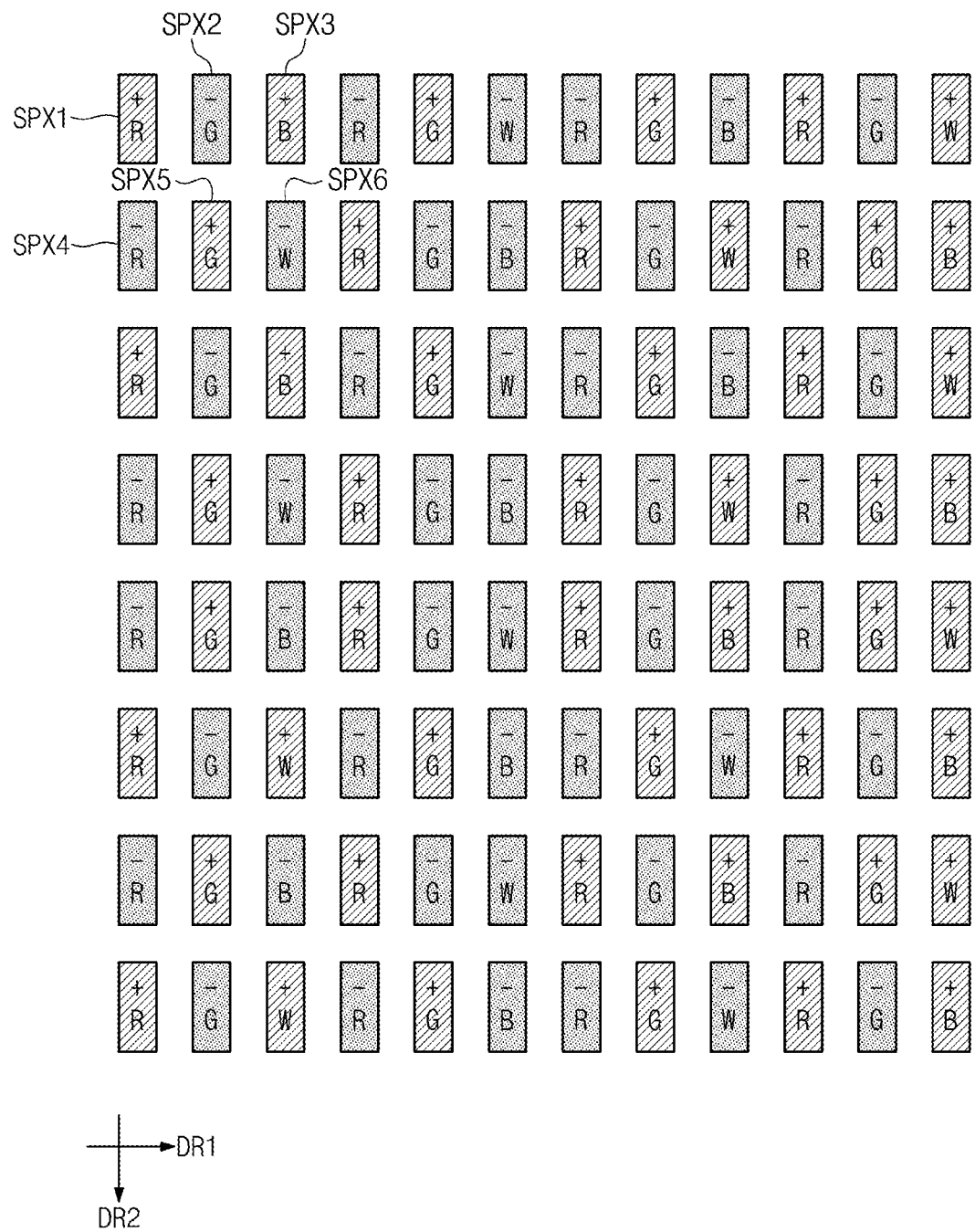

FIG. 10A is a plan view showing a state in which the red pixels of FIG. 9 are turned on, FIG. 10B is a plan view showing a state in which the green pixels of FIG. 9 are turned on, FIG. 10C is a plan view showing a state in which the blue pixels of FIG. 9 are turned on, and FIG. 10D is a plan view showing a state in which all pixels of FIG. 9 are turned on.

Referring to FIG. 10A, the first pixel SPX1 receives a positive polarity red data voltage R+ and the fourth pixel SPX receives a negative polarity red data voltage R−. Although the positive red data voltage R+ and the negative red data voltage R− have the same grayscale, a difference in voltage occurs between the positive polarity (+) red data voltage R+ and the positive polarity (−) red data voltage R− due to a kickback voltage. Thus, a difference in brightness occurs between the first and fourth pixels SPX1 and SPX4. For convenience of explanation, the first and second pixels SPX1 and SPX4 are represented by different hatchings in FIG. 10A.

When a sum of polarities of the data voltages applied to the pixels arranged in the same pixel row is biased to the positive (+) polarity or the negative (−) polarity, the common voltage ripples to a positive direction or a negative direction due to a coupling phenomenon between the common electrode and the data lines.

However, as shown in FIG. 10A, the first and fourth pixels SPX1 and SPX4 are arranged in repeating manner along the first direction DR1. That is, the number of the first pixels SPX1 is equal to the number of the fourth pixels SPX4 in one pixel row. Accordingly, the common voltage is prevented from being rippled to the positive or negative direction with respect to the reference voltage, and thus horizontal crosstalk is prevented from occurring.

The first and fourth pixels SPX1 and SPX4 are arranged in repeating manner along the second direction DR2, and the number of the first pixels SPX1 is equal to the number of the fourth pixels SPX4 in one dot column. Accordingly, brightness difference is prevented from occurring between the dot columns, and thus a moving line-stain, or a vertical line perceived when the i-th frame is changed to the (i−1)th frame, is prevented from occurring.

Similarly, the second and fifth pixels SPX2 and SPX5 are arranged in repeating manner along the first and second directions DR1 and DR2, and the number of the second pixels SPX2 is equal to the number of the fifth pixels SPX5 in the same dot column and in the same dot row. The second pixel SPX2 receives a positive polarity green data voltage G+ and the fifth pixel SPX5 receives a negative polarity green data voltage G−. Therefore, brightness difference does not occur between dot rows and between dot columns, and thus horizontal crosstalk and moving line-stains are prevented from occurring.

Referring to FIG. 10C, the third pixel SPX3 of the first dot group DTG1 receives a positive polarity blue data voltage B+ and the third pixel SPX3 of the second dot group DTG2 receives a negative polarity blue data voltage B−. The first and second dot groups DTG1 and DTG2 are alternately arranged along the second direction DR2. The third sub pixels SPX3 are arranged in different dot rows in the first direction DR1. Accordingly, brightness difference does not occur between dot rows and between dot columns with respect to the blue color, and thus horizontal crosstalk and moving line-stains are prevented from occurring.

As described above, the positive and negative pixels displaying the red, green, blue, and white pixels are arranged in repeating manner along the dot rows and the dot columns, and the number of positive pixels is equal to the number of negative pixels with respect to each of the red, green, blue, and white pixels. Thus, although all pixels are substantially and simultaneously operated as shown in FIG. 10D, brightness difference does not occur between the dot rows and the dot columns. As a result, the horizontal crosstalk phenomenon and the moving line-stain phenomenon may be prevented from occurring.

Figure 11:
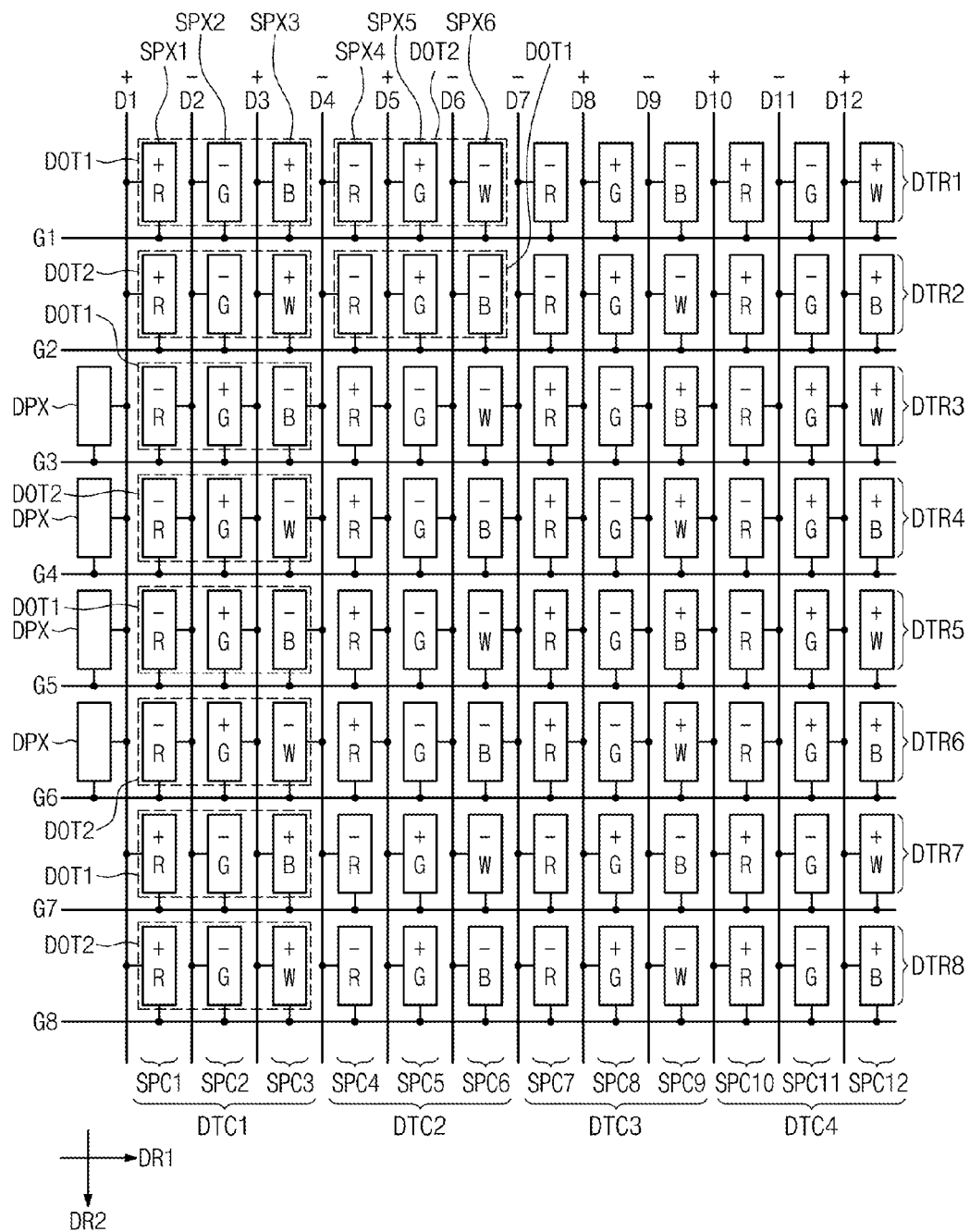
FIG. 11 is a plan view showing a portion of a liquid crystal panel according to another exemplary embodiment of the present disclosure.

FIG. 11 is a plan view showing a portion of a liquid crystal panel according to another exemplary embodiment of the present disclosure.

Referring to FIG. 11, a display apparatus according to the present exemplary embodiment includes first and second dots DOT1 and DOT2. The first dot DOT1 includes first, second, and third pixels SPX1, SPX2, and SPX3 and the second dot DOT2 includes fourth, fifth, and sixth pixels SPX4, SPX5, and SPX6. The first and second dots DOT1 and DOT2 are arranged in alternating manner along the first and second directions DR1 and DR2.

In the first dot column DTC1, the first dots DOT1 of first and seventh dot rows DTR1 and DTR7 each include first, second, and third pixels SPX1, SPX2, and SPX3 respectively connected to the first, second, and third data lines D1, D2, and D3, and the second dots DOT2 of the second and eighth dot rows DTR2 and DTR8 each include fourth, fifth, and sixth pixels SPX4, SPX5, and SPX6 respectively connected to the first, second, and third data lines D1, D2, and D3. In the first dot column DTC1, the first dots DOT1 of the third and fifth dot rows DTR3 and DTR5 each include first, second, and third pixels SPX1, SPX2, and SPX3 respectively connected to the second, third, and fourth data lines D2, D3, and D4, and the second dots DOT2 of the fourth and sixth dot rows DTR4 and DTR6 each include fourth, fifth, and sixth pixels SPX4, SPX5, and SPX6 respectively connected to the second, third, and fourth data lines D2, D3, and D4.

In the second dot column DTC2, the first dots DOT1 of the second and eighth dot rows DTR2 and DTR8 each include first, second, and third pixels SPX1, SPX2, and SPX3 respectively connected to the fourth, fifth, and sixth data lines D4, D5, and D6, and the second dots DOT2 of the first and seventh dot rows DTR1 and DTR7 each include fourth, fifth, and sixth pixels SPX4, SPX5, and SPX6 respectively connected to the fourth, fifth, and sixth data lines D4, D5, and D6. In the second dot column DTC2, the first dots DOT1 of the fourth and sixth dot rows DTR4 and DTR6 each include first, second, and third pixels SPX1, SPX2, and SPX3 respectively connected to the fifth, sixth, and seventh data lines D5, D6, and D7, and the second dots DOT2 of the third and fifth dot rows DTR3 and DTR5 each include fourth, fifth, and sixth pixels SPX4, SPX5, and SPX6 respectively connected to the fifth, sixth, and seventh data lines D5, D6, and D7.

In the first pixel column SPC1, the first pixels SPX1 receiving the positive polarity red data voltage R+ are disposed in the first and seventh dot rows DOT1 and DOT7, and the first pixels SPX1 receiving the negative polarity red data voltage R− are disposed in the third and fifth dot rows DTR3 and DTR5. In the first pixel column SPC1, the second pixels SPX2 receiving the positive polarity red data voltage R+ are disposed in the second and eighth dot rows DTR2 and DTR8, and the second pixels SPX2 receiving the negative red data voltage R− are disposed in the fourth and sixth dot rows DTR4 and DTR6. Accordingly, the polarities of the data voltages of +, +, −, and − are inverted to the polarities of −, −, +, and + in the same pixel column along the second direction DR2.

The second pixel column SPC2 has the similar structure as the first pixel column SPC1 except with different colors.

In the third pixel column SPC3, the third pixels SPX3 receiving the positive polarity blue data voltage B+ are disposed in the first and seventh dot rows DOT1 and DOT7, and the third pixels SPX3 receiving the negative polarity blue data voltage B− are disposed in the third and fifth dot rows DTR3 and DTR5. In the third pixel column SPC3, the sixth pixels SPX6 receiving the positive polarity white data voltage W+ are disposed in the second and eighth dot rows DTR2 and DTR8, and the sixth pixels SPX6 receiving the negative polarity white data voltage W− are disposed in the fourth and sixth dot rows DTR4 and DTR6.

As described above, the positive and negative pixels displaying the red, green, blue, and white colors are repeatedly arranged in the dot rows and the dot columns. Thus, brightness difference does not occur between the dot rows and the dot columns. As a result, the horizontal crosstalk phenomenon and the moving line-stain phenomenon may be prevented from occurring.

Figure 12:
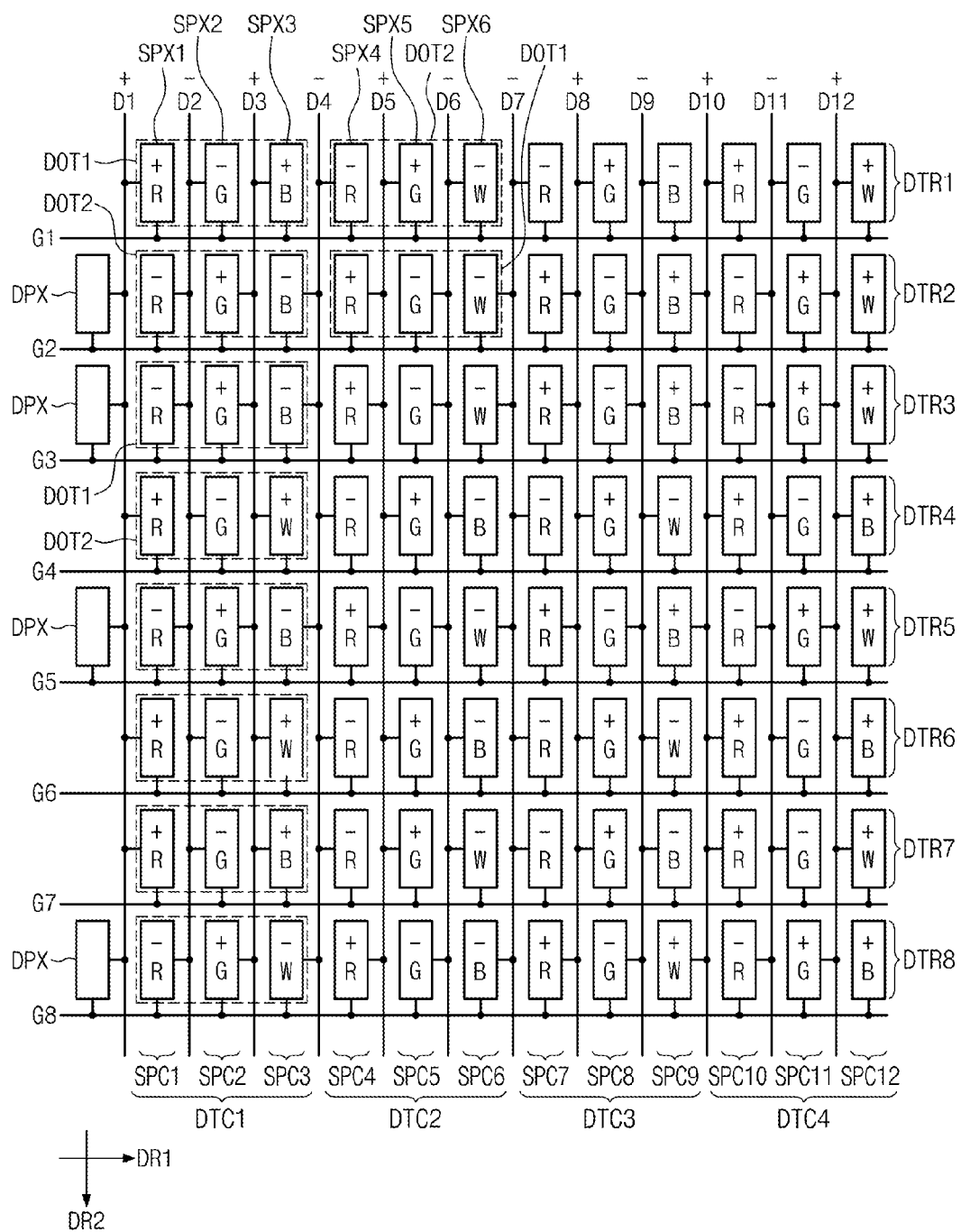
FIG. 12 is a plan view showing a portion of a liquid crystal panel according to another exemplary embodiment of the present disclosure.

FIG. 12 is a plan view showing a portion of a liquid crystal panel according to another exemplary embodiment of the present disclosure.

Referring to FIG. 12, a display apparatus according to the present exemplary embodiment includes first and second dots DOT1 and DOT2. The first dot DOT1 includes first, second, and third pixels SPX1, SPX2, and SPX3 and the second dot DOT2 includes fourth, fifth, and sixth pixels SPX4, SPX5, and SPX6. The first and second dots DOT1 and DOT2 are alternately arranged in the first and second directions DR1 and DR2.

In the first dot column DTC1, the first dot DOT1 of first and seventh dot rows DTR1 and DTR7 includes first, second, and third pixels SPX1, SPX2, and SPX3 respectively connected to the first, second, and third data lines D1, D2, and D3, and the second dot DOT2 of the second and eighth dot rows DTR2 and DTR8 includes fourth, fifth, and sixth pixels SPX4, SPX5, and SPX6 respectively connected to the second, third, and fourth data lines D2, D3, and D4. In the first dot column DTC1, the first dot DOT1 of the third and fifth dot rows DTR3 and DTR5 includes first, second, and third pixels SPX1, SPX2, and SPX3 respectively connected to the second, third, and fourth data lines D2, D3, and D4, and the second dot DOT2 of the fourth and sixth dot rows DTR4 and DTR6 includes fourth, fifth, and sixth pixels SPX4, SPX5, and SPX6 respectively connected to the first, second, and third data lines D1, D2, and D3.

In the second dot column DTC2, the first dot DOT1 of the second and eighth dot rows DTR2 and DTR8 includes first, second, and third pixels SPX1, SPX2, and SPX3 respectively connected to the fifth, sixth, and seventh data lines D5, D6, and D7, and the second dot DOT2 of the first and seventh dot rows DTR1 and DTR7 includes fourth, fifth, and sixth pixels SPX4, SPX5, and SPX6 respectively connected to the fourth, fifth, and sixth data lines D4, D5, and D6. In the second dot column DTC2, the first dot DOT1 of the fourth and sixth dot rows DTR4 and DTR6 includes first, second, and third pixels SPX1, SPX2, and SPX3 respectively connected to the fourth, fifth, and sixth data lines D4, D5, and D6 and the second dot DOT2 of the third and fifth dot rows DTR3 and DTR5 includes fourth, fifth, and sixth pixels SPX4, SPX5, and SPX6 respectively connected to the fifth, sixth, and seventh data lines D5, D6, and D7.

In the first pixel column SPC1, the first pixels SPX1 receiving the positive polarity red data voltage R+ are disposed in the first and seventh dot rows DOT1 and DOT7, and the first pixels SPX1 receiving the negative polarity red data voltage R− are disposed in the third and fifth dot rows DTR3 and DTR5. In the first pixel column SPC1, the fourth pixels SPX4 receiving the positive polarity red data voltage R+ are disposed in the fourth and sixth dot rows DTR4 and DTR6, and the fourth pixel SPX4 receiving the negative polarity red data voltage R− is disposed in the second and eighth dot rows DTR2 and DTR8. Accordingly, the pixels receiving the positive polarity red data voltage R+ and the pixels receiving the negative polarity red data voltage R− are reversed in order every four dot rows. That is, the polarities of the data voltages of +, −, −, and + are inverted to the polarities of −, +, +, and − in the same pixel column along the second direction DR2.

The second and third pixel columns SPC2 and SPC3 have a similar structure as the first pixel column SPC1 but with different pixel colors.

As described above, the positive and negative pixels displaying the red, green, blue, and white pixels are arranged in repeating order along the dot rows and the dot columns. Thus, brightness difference does not occur between the dot rows and the dot columns. As a result, the horizontal crosstalk phenomenon and the moving line-stain phenomenon may be prevented from occurring.

Figure 13:
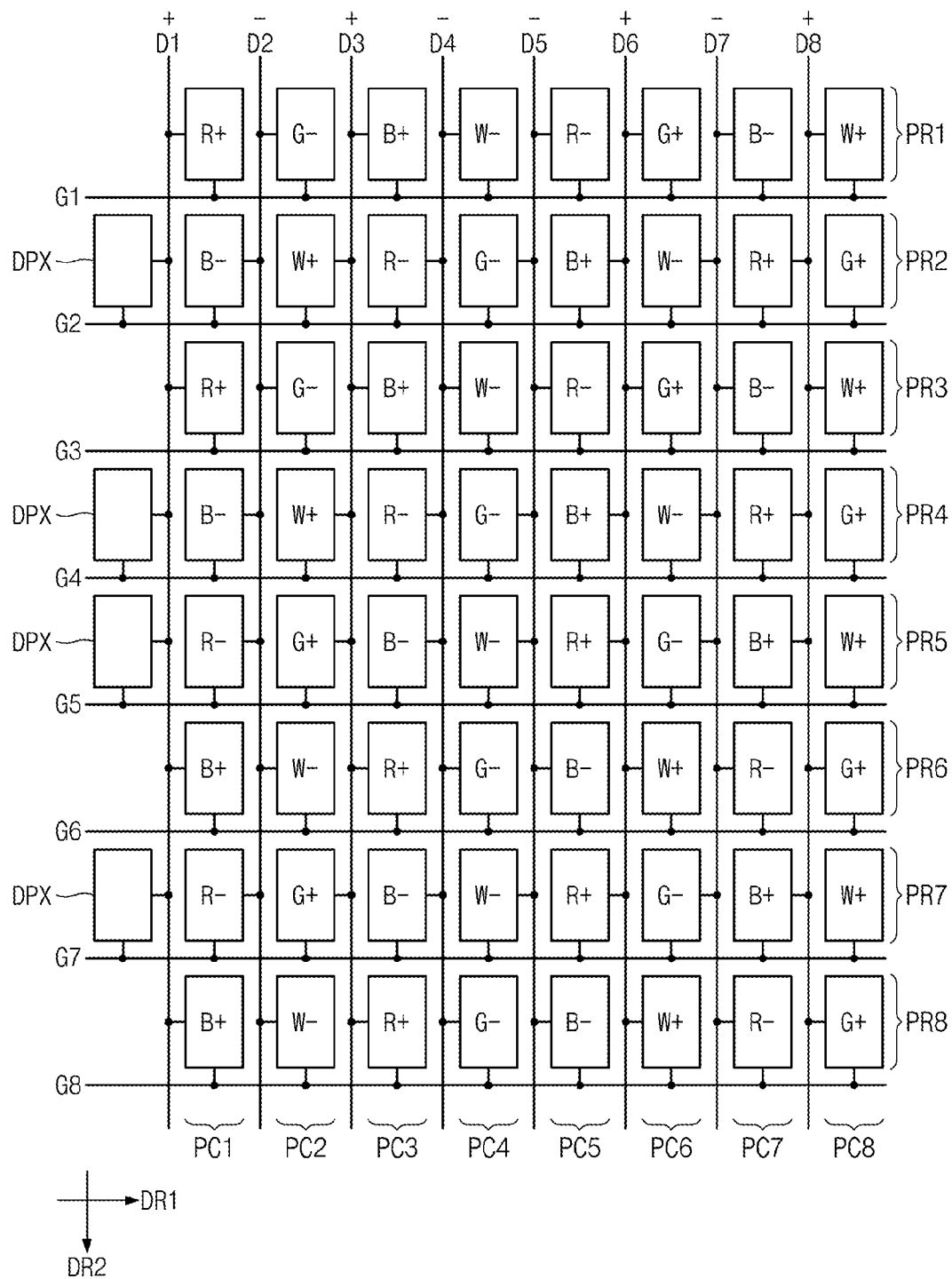
FIG. 13 is a plan view showing a portion of a liquid crystal panel according to another exemplary embodiment of the present disclosure.

FIG. 13 is a plan view showing a portion of a liquid crystal panel according to another exemplary embodiment of the present disclosure.

Referring to FIG. 13, pixels arranged in a first pixel column between the first and second data lines D1 and D2 are alternately connected to the first and second data lines D1 and D2 within each pixel group. More specifically, the connection structure between the pixels and the first and second data lines D1 and D2 changes every 4i pixels. When i=1, among the pixels arranged in the first to fourth pixel rows PR1 to PR4, the pixels of the first and third pixel rows PR1 and PR3 are connected to the first data line D1 and the pixels of the second and fourth pixel rows PR2 and PR4 are connected to the second data line D2. On the contrary, among the pixels arranged in the fifth to eighth pixel rows PR5 to PR8, the pixels of the fifth and seventh pixel rows PR5 and PR7 are connected to the second data line D2 and the pixels of the sixth and eighth pixel rows PR6 and PR8 are connected to the first data line D1.

Among the pixels in the first pixel column PC1, the red pixel R is disposed in odd-numbered pixel rows, i.e., the first, third, fifth, and seventh pixel rows PR1, PR3, PR5, and PR7, and the blue pixel B is disposed in even-numbered pixel rows, i.e., the second, fourth, sixth, and eighth pixel rows PR2, PR4, PR6, and PR8. Among the pixels arranged in the second pixel column PC2, the green pixel G is disposed in the odd-numbered pixel rows PR1, PR3, PR5, and PR7, and the white pixel W is disposed in the even-numbered pixel rows PR2, PR4, PR6, and PR8. Among the pixels arranged in the third pixel column PC3, the blue pixel B is disposed in the odd-numbered pixel rows PR1, PR3, PR5, and PR7, and the red pixel R is disposed in the even-numbered pixel rows PR2, PR4, PR6, and PR8. Among the pixels arranged in the fourth pixel column PC4, the white pixel W is disposed in the odd-numbered pixel rows PR1, PR3, PR5, and PR7, and the green pixel G is disposed in the even-numbered pixel rows PR2, PR4, PR6, and PR8.

The pixels forming one column are connected to the left and right data lines in groupings of 4i pixels. Accordingly, the red pixels R+ of the first and third pixel rows PR1 and PR3 of the first pixel column PC1 are connected to the first data line D1, and the blue pixels B− of the second and fourth pixel rows PR2 and PR4 of the first pixel column PC1 are connected to the second data line D2. In addition, the red pixels R− of the fifth and seventh pixel rows PR5 and PR7 of the first pixel column PC1 are connected to the second data line D2, and the blue pixels B+ of the sixth and eighth pixel rows PR6 and PR8 of the first pixel column PC1 are connected to the first data line D1.

Therefore, although the polarity of the data voltages applied to the first and second data lines D1 and D2 is not changed within one frame period, the positive pixels and the negative pixels are alternately arranged with each other within the one pixel column. In particular, the pixels having the same color are disposed to periodically have different polarities from each other within any given pixel column. As an example, the pixels having the same color may have different polarities every four pixel rows in at least three pixel columns of each grouping of four successive pixel columns. Each of the pixels has a ratio of a horizontal width to a vertical width of 1:3.

Figure 14:
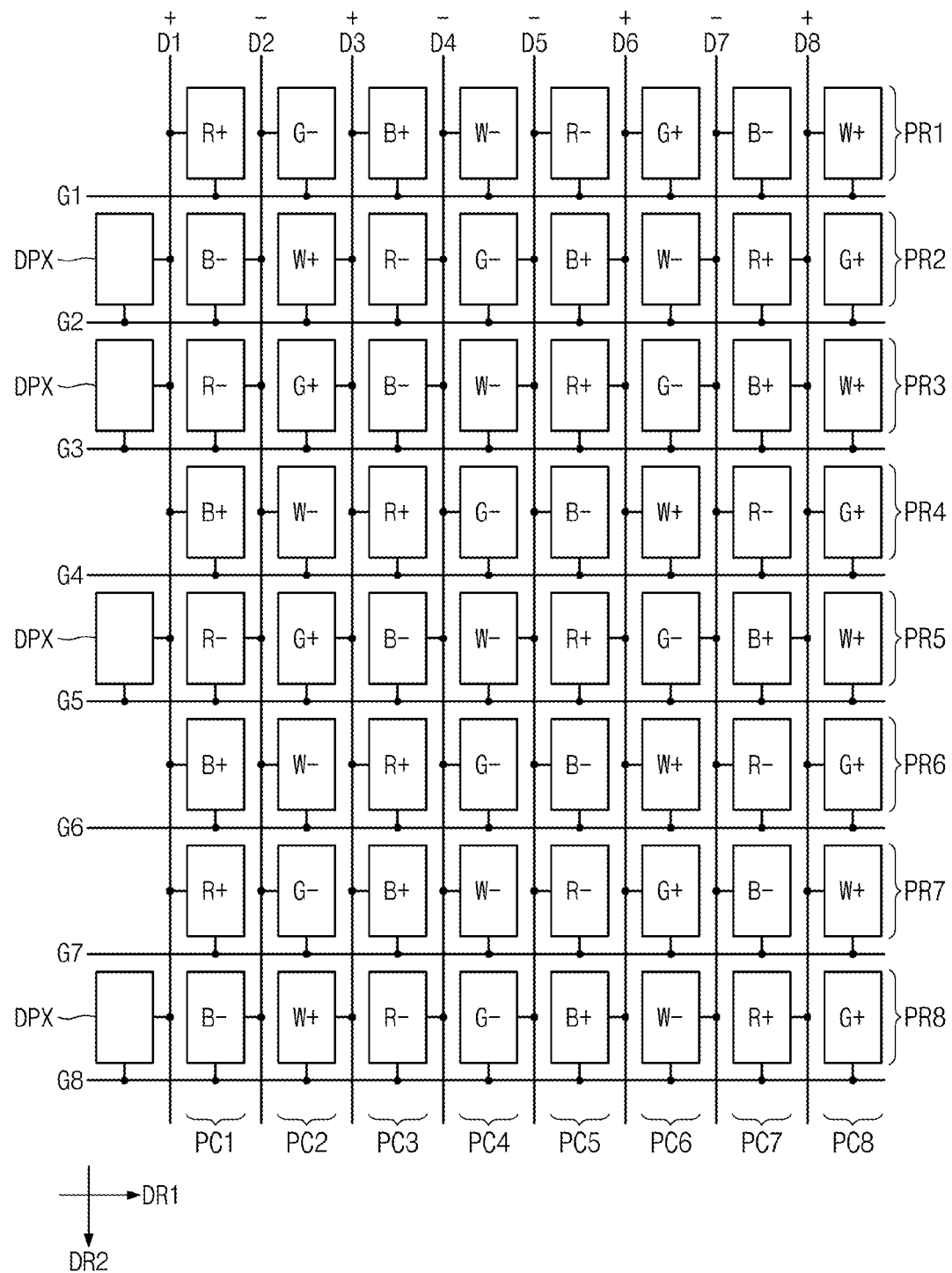
FIG. 14 is a plan view showing a portion of a liquid crystal panel according to another exemplary embodiment of the present disclosure.

FIG. 14 is a plan view showing a portion of a liquid crystal panel according to another exemplary embodiment of the present disclosure.

Referring to FIG. 14, the connection structure between the pixels and their adjacent left/right data lines changes every 4i pixels in each pixel column. For instance, when i=1, among the pixels arranged in the first to fourth pixel rows PR1 to PR4 of the first pixel column PC1, the pixels arranged in the first and fourth pixel rows PR1 and PR4 are connected to the first data line D1, and the pixels arranged in the second and third pixel rows PR2 and PR3 are connected to the second data line D2. On the contrary, among the pixels arranged in the fifth to eighth pixel columns PR5 to PR8, the pixels arranged in the fifth and eighth pixel rows PR5 and PR8 are connected to the second data line D2, and the pixels arranged in the sixth and seventh pixel rows PR6 and PR7 are connected to the first data line D1.

The color arrangement of the pixels shown in FIG. 14 is the same as the color arrangement of the pixels shown in FIG. 13, and thus detailed descriptions of the color arrangement of the pixels shown in FIG. 14 will be omitted.

The pixels forming one pixel column are connected to the left and right data lines in groupings of 4i pixels. Accordingly, the red pixels R+ of the first and seventh pixel rows PR1 and PR7 of the first pixel column are connected to the first data line D1, and the blue pixels B− of the second and eighth pixel rows PR2 and PR8 of the first pixel column are connected to the second data line D2. In addition, the red pixels R− of the third and fifth pixel rows PR3 and PR5 of the first pixel column PC1 are connected to the second data line D2, and the blue pixels B+ of the fourth and sixth pixel rows PR4 and PR6 of the first pixel column PC1 are connected to the first data line D1.

Therefore, although the polarity of the data voltages applied to the first and second data lines D1 and D2 is not changed within one frame period, the positive pixels and the negative pixels are alternately arranged within a given pixel column. In particular, the pixels having the same color are disposed to periodically have different polarities from each other within a given pixel column. As an example, the pixels having the same color may have different polarities every four pixel rows in at least three pixel columns of a four pixel column grouping.

Figure 15:
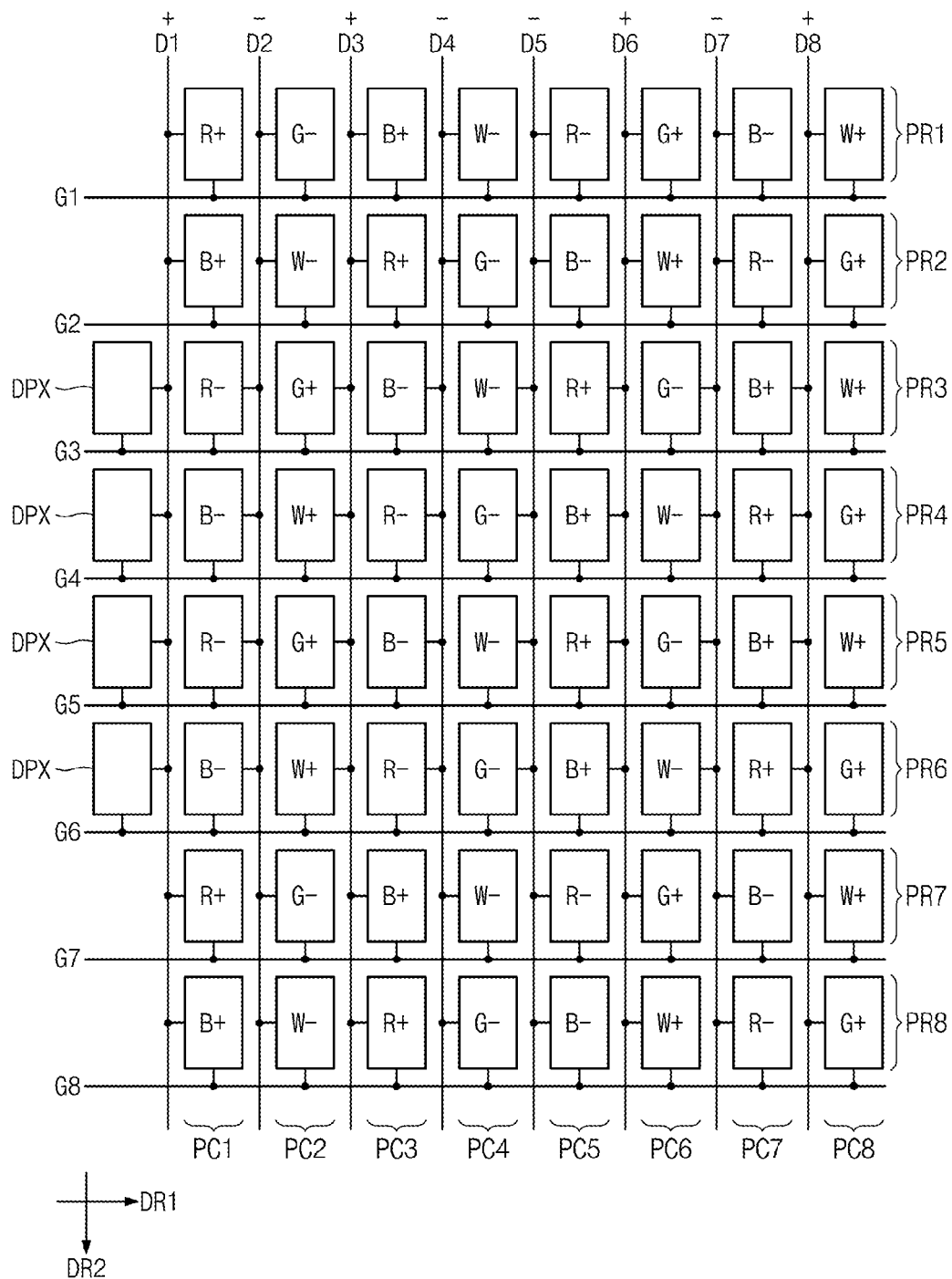
FIG. 15 is a plan view showing a portion of a liquid crystal panel according to another exemplary embodiment of the present disclosure.

FIG. 15 is a plan view showing a portion of a liquid crystal panel according to another exemplary embodiment of the present disclosure.

Referring to FIG. 5, the pixels forming one pixel column are connected to their adjacent left and right data lines in groupings of 4i pixels. Accordingly, the red pixels R+ of the first and seventh pixel rows PR1 and PR7 of the first pixel column PC1 are connected to the first data line D1, and the blue pixels B+ of the second and eighth pixel rows PR2 and PR8 of the first pixel column PC1 are connected to the first data line D1. In addition, the red pixels R− of the third and fifth pixel rows PR3 and PR5 of the first pixel column PC1 are connected to the second data line D2, and the blue pixels B− of the fourth and sixth pixel rows PR4 and PR6 of the first pixel column PC1 are connected to the second data line D2.

Therefore, although the polarity of the data voltages applied to the first and second data lines D1 and D2 is not changed within one frame period, the positive pixels and the negative pixels are alternately arranged within one pixel column. In particular, the pixels having the same color are disposed to periodically have different polarities from each other within one pixel column. As an example, the pixels having the same color may have different polarities every four pixel rows, for at least three of every four adjacent pixel columns.

As described above, positive and negative pixels displaying the red, green, blue, and white colors are repeatedly arranged within dot rows. Thus, brightness difference does not occur between different dot rows and different dot columns. As a result, the horizontal crosstalk phenomenon and the moving line-stain phenomenon may be prevented from occurring.

Although the exemplary embodiments of the present invention have been described, it is understood that the present invention should not be limited to these exemplary embodiments but various changes and modifications can be made by one ordinary skilled in the art within the spirit and scope of the present invention as hereinafter claimed. Various features of the above described and other embodiments can be mixed and matched in any manner, to produce further embodiments consistent with the invention.

What is claimed is:

1. A display apparatus comprising:
 a plurality of gate lines extending in a first direction;
 a plurality of data lines extending in a second direction crossing the first direction; and
 a plurality of pixels connected to the gate lines and the data lines, wherein:
  the pixels comprise pixels arranged in a k-th (k is an integer number equal to or greater than 1) column between a k-th data line and a (k+1)th data line,
  the pixels in the k-th column are arranged in a plurality of groups, each of the groups comprising 2i (where i is an integer number equal to or greater than 1) first pixels connected to the k-th data line and 2i second pixels connected to the (k+1)th data line,
  successive ones of the pixels in each group are connected to the k-th data line and the (k+1)th data line in alternating manner, and
  each pixel has a width in the first direction that is greater than a width in the second direction
  wherein a polarity of data voltages applied to the data lines is inverted every 4i data lines.

2. The display apparatus of claim 1, wherein the pixels in the k-th column are arranged in a repeating pattern of four different colors.

3. The display apparatus of claim 2, wherein, among the pixels in the k-th column, the pixels in j-th (where j is an integer number equal to or greater than 1) and (j+4)th rows have a same color, the pixels in (j+1)th and (j+5)th rows have a same color, the pixels in (j+2)th and (j+6)th rows have a same color, and the pixels in (j+3)th and (j+7)th rows have a same color.

4. The display apparatus of claim 3, wherein the pixels in the k-th column have red, green, blue, and white colors arranged in sequence.

5. The display apparatus of claim 3, wherein, among the pixels in the k-th column, the pixels in the j-th, (j+2)th, (j+5)th, and (j+7)th rows are connected to the k-th data line, and the pixels in the (j+1)th, (j+3)th, (j+4)th, and (j+6)th rows are connected to the (k+1)th data line.

6. The display apparatus of claim 3, wherein, among the pixels in the k-th column, the pixels in the j-th, (j+1)th, (j+6)th, and (j+7)th rows are connected to the k-th data line, and the pixels in the (j+2)th, (j+3)th, (j+4)th, and (j+5)th rows are connected to the (k+1)th data line.

7. The display apparatus of claim 3, wherein, among the pixels in the k-th column, the pixels in the j-th, (j+3)th, (j+5)th, and (j+6)th rows are connected to the k-th data line, and the pixels in the (j+1)th, (j+2)th, (j+4)th, and (j+7)th rows are connected to the (k+1)th data line.

8. The display apparatus of claim 2, wherein a first pixel of each group has either a first or a second color from among the four colors, and a respectively adjacent second pixel of each group has either a third or a fourth color from among the four colors.

9. The display apparatus of claim 8, wherein the first and second colors are red and blue colors, respectively, and the third and fourth colors are green and white colors, respectively.

10. The display apparatus of claim 1, wherein the data voltages applied to the k-th, (k+2)th, (k+5)th, and (k+7)th data lines have a first polarity, and the data voltages applied to the (k+1)th, (k+3)th, (k+4)th, and (k+6)th data lines have a second polarity.

11. The display apparatus of claim 1, wherein the data voltages applied to the k-th, (k+1)th, (k+4)th, and (k+5)th data lines have a first polarity, and the data voltages applied to the (k+2)th, (k+3)th, (k+6)th, and (k+7)th data lines have a second polarity.

12. The display apparatus of claim 1, wherein the data voltages applied to the k-th, (k+3)th, (k+5)th, and (k+6)th data lines have a first polarity, and the data voltages applied to the (k+1)th, (k+2)th, (k+4)th, and (k+7)th data lines have a second polarity.

13. The display apparatus of claim 1, further comprising dummy pixels connected to a first data line and a last data line from among the data lines.

14. The display apparatus of claim 13, wherein the dummy pixels connected to the first data line are disposed in a same pixel row as that of the second pixels, and the dummy pixels connected to the last data line are disposed in a same pixel row as that of the first pixels.

15. The display apparatus of claim 1, wherein the pixels in a j-th (where j is an integer number equal to or greater than 1) row have red, green, blue, and white colors arranged in sequence, the pixels in the k-th column have first and second colors from among the red, green, blue, and white colors, and the pixels in the (k+1)th column have third and fourth colors from among the red, green, blue, and white colors.

16. The display apparatus of claim 15, wherein the first and second colors are the red and blue colors, respectively, and the third and fourth colors are the green and white colors, respectively.

17. The display apparatus of claim 16, wherein, among the pixels in the k-th column, the pixels in the j-th, (j+2)th, (j+5)th, and (j+7)th rows are connected to the k-th data line, and the pixels in the (j+1)th, (j+3)th, (j+4)th, and (j+6)th rows are connected to the (k+1)th data line.

18. A display apparatus comprising:
a plurality of gate lines extending in a first direction;
a plurality of data lines extending in a second direction crossing the first direction; and
a plurality of pixels connected to the gate lines and the data lines, the plurality of pixels comprising at least first and second dots, wherein:
the first dot comprises first, second, and third pixels sequentially arranged in the first direction,
the second dot comprises fourth, fifth, and sixth pixels sequentially arranged in the first direction, and
the pixels in a k-th (k is an integer number equal to or greater than 1) column are arranged in groups of 4i (i is an integer number equal to or greater than 1) pixels, the pixels of each group being connected to their two adjacent data lines in alternating manner such that, among the pixels in the k-th column, the pixel in a j-th (where j is an integer number equal to or greater than 1) row is connected to whichever of the k-th data line or (k+1)th data line that a pixel in the (j+4)th row is not connected to.

19. The display apparatus of claim 18, wherein:
the first and second dots are arranged in alternating manner along the first and second directions so as to form a plurality of dot rows and a plurality of dot columns,
each of the dot columns comprises first, second, and third pixel columns,
the first and fourth pixels are in the first pixel column,
the second and fifth pixels are in the second pixel column, and
the third and sixth pixels are in the third pixel column.

20. The display apparatus of claim 19, wherein the first and fourth pixels have a red color, the second and fifth pixels have a green color, and the third and sixth pixels respectively have blue and white colors.

21. The display apparatus of claim 18, wherein, among the pixels in the k-th column, the pixels in the j-th, (j+2)th, (j+5)th, and (j+7)th rows are connected to the k-th data line, and the pixels in the (j+1)th, (j+3)th, (j+4)th, and (j+6)th rows are connected to the (k+1)th data line.

22. The display apparatus of claim 18, wherein, among the pixels in the k-th column, the pixels in the j-th, (j+1)th, (j+6)th, and (j+7)th rows are connected to the k-th data line, and the pixels in the (j+2)th, (j+3)th, (j+4)th, and (j+5)th rows are connected to the (k+1)th data line.

23. The display apparatus of claim 18, wherein, among the pixels in the k-th column, the pixels in the j-th, (j+3)th, (j+5)th, and (j+6)th rows are connected to the k-th data line, and the pixels in the (j+1)th, (j+2)th, (j+4)th, and (j+7)th rows are connected to the (k+1)th data line.

24. A display apparatus, comprising:
a display panel having a plurality of data lines and a plurality of pixels arranged in a plurality of rows and a plurality of columns, each column having two adjacent ones of the data lines, the pixels of each column collectively being connected through switching elements to both adjacent ones of the data lines;
wherein each pixel has one of four different colors;
wherein the data lines are arranged to receive data signals of both positive and negative polarities, so that:
each row has a number of the pixels receiving the positive polarities that is equal to a number of the pixels receiving the negative polarities;
each column has a number of the pixels receiving the positive polarities that is equal to a number of the pixels receiving the negative polarities;
for each row, and for each color, a number of the pixels of that color receiving the positive polarities is equal to a number of the pixels of that color receiving the negative polarities;
for each column, and for each color, a number of the pixels of that color receiving the positive polarities is equal to a number of the pixels of that color receiving the negative polarities; and
wherein a polarity of data voltages applied to the data lines is inverted every 4i (where i is an integer number equal to or greater than 1) data lines.

* * * * *